United States Patent
Li et al.

(10) Patent No.: US 10,623,154 B2
(45) Date of Patent: Apr. 14, 2020

(54) METHOD AND DEVICE FOR CONFIGURING CHANNEL STATE INFORMATION REFERENCE SIGNAL, AND METHOD AND DEVICE FOR PARSING CONFIGURING CHANNEL STATE INFORMATION REFERENCE SIGNAL

(71) Applicant: ZTE CORPORATION, Guangdong (CN)

(72) Inventors: Yong Li, Guangdong (CN); Yijian Chen, Guangdong (CN); Yu Ngok Li, Guangdong (CN); Zhaohua Lu, Guangdong (CN); Huahua Xiao, Guangdong (CN); Hao Wu, Guangdong (CN); Yuxin Wang, Guangdong (CN); Jianxing Cai, Guangdong (CN)

(73) Assignee: ZTE Corporation, Shenzhen, Guangdon (KR)

( * ) Notice: Subject to any disclaimer, the term of this patent is extended or adjusted under 35 U.S.C. 154(b) by 0 days.

(21) Appl. No.: 15/774,090

(22) PCT Filed: Oct. 28, 2016

(86) PCT No.: PCT/CN2016/103818
§ 371 (c)(1),
(2) Date: May 7, 2018

(87) PCT Pub. No.: WO2017/076233
PCT Pub. Date: May 11, 2017

(65) Prior Publication Data
US 2018/0316471 A1    Nov. 1, 2018

(30) Foreign Application Priority Data
Nov. 6, 2015    (CN) .......................... 2015 1 0753467

(51) Int. Cl.
*H04L 5/00*    (2006.01)

(52) U.S. Cl.
CPC ............ *H04L 5/0048* (2013.01); *H04L 5/005* (2013.01); *H04L 5/0091* (2013.01);
(Continued)

(58) Field of Classification Search
CPC .... H04B 7/0626; H04B 7/024; H04B 7/0608; H04L 5/0048; H04L 1/0693;
(Continued)

(56) References Cited

U.S. PATENT DOCUMENTS

| 2012/0127878 A1* | 5/2012 | Kim ..................... H04W 74/002 370/252 |
| 2013/0021926 A1* | 1/2013 | Geirhofer ............. H04L 5/0048 370/252 |

(Continued)

FOREIGN PATENT DOCUMENTS

| CN | 102412940 A | 4/2012 |
| CN | 103179664 A | 6/2013 |

(Continued)

OTHER PUBLICATIONS

International Search Report dated Jan. 4, 2017 for International Application No. PCT/CN2016/103818, 5 pages.

(Continued)

*Primary Examiner* — Jung Liu
(74) *Attorney, Agent, or Firm* — Knobbe Martens Olson & Bear LLP

(57) ABSTRACT

The present disclosure provides a method and device for configuring a channel state information reference signal (CSI-RS), and a method and device for parsing CSI-RS. The configuration method includes: configuring configuration information of the CSI-RS by a base station; generating a signaling carrying the configuration information of the CSI-RS by the base station; and transmitting the signaling by the base station. The configuration information includes at least (Continued)

one of: a number of CSI-RS ports, a number K of components of a pilot resource pattern, a number N of ports of the components of the pilot resource pattern, and a CSI-RS port-sorting mode, where the CSI-RS port-sorting mode includes M types of candidate port-sorting mode, and M, K, and N are positive integers.

15 Claims, 8 Drawing Sheets

(52) U.S. Cl.
CPC .......... *H04L 5/0007* (2013.01); *H04L 5/0016* (2013.01); *H04L 5/0023* (2013.01)

(58) Field of Classification Search
CPC ... H04L 1/0026; H04L 5/0023; H04L 5/0051; H04L 1/0687; H04L 5/0032; H04L 5/0091; H04L 5/0069; H04L 5/006; H04L 5/0057; H04W 24/10; H04W 72/042; H04W 84/042; H04W 74/002; H04W 24/02

See application file for complete search history.

(56) References Cited

U.S. PATENT DOCUMENTS

| | | | | |
|---|---|---|---|---|
| 2013/0028182 | A1* | 1/2013 | Geirhofer | H04B 7/0626 370/328 |
| 2014/0016497 | A1* | 1/2014 | Seo | H04L 5/0023 370/252 |
| 2015/0180684 | A1* | 6/2015 | Chen | H04B 17/24 370/252 |
| 2016/0080059 | A1 | 3/2016 | Yoon | |
| 2019/0131008 | A1* | 5/2019 | Gao | G06Q 50/22 |

FOREIGN PATENT DOCUMENTS

| | | |
|---|---|---|
| CN | 103220703 A | 7/2013 |
| CN | 103973399 A | 8/2014 |
| WO | 2014/123340 A1 | 8/2014 |

OTHER PUBLICATIONS

Written Opinion of the International Searching Authority dated Jan. 4, 2017 for International Application No. PCT/CN2016/103818, 3 pages.

European Search Report dated Feb. 15, 2019 for Application No. EP 16 86 1501, 13 pages.

EC Group: "Configuration and signalling for CSI-RS", 3GPP Draft; RI-104529-CSIRS-Signalling, 3rd Generation Partnership Project (3GPP), Mobile Competence Centre ; 650, Route Des Lucioles ; F-06921 Sophia-Antipolis Cedex ; France, vol. RAN WGI, No. Madrid, Spain; Aug. 23, 2010, Aug. 17, 2010, XP050449834.

Huawei et al: "Discussion on CSI-RS design and signalling for 16 ports", 3GPP Draft; RI-155080, 3rd Generation Partnership Project (3GPP), Mobile Competence Centre ; 650, Route Des Lucioles; F-06921 Sophia-Antipolis Cedex ; France • vol. RAN WGI, No. Malmo, Sweden; 20151005-4 Oct. 2015, XP051002070.

ITL Inc: "Details on 12- and 16-port NZP CSI-RS resource configuration for FD-MIMO", 3GPP Draft; RI-155773, 3rd Generation Partnership Project (3GPP), Mobile Competence Centre ; 650, Route Des Lucioles ; F-06921 Sophia-Antipolis Cedex ; France vol. RAN WGI, No. Malmo, Sweden; 20151005-2015100926 Sep. 2015, XP051021751.

\* cited by examiner

METHOD AND DEVICE FOR CONFIGURING CHANNEL STATE INFORMATION REFERENCE SIGNAL, AND METHOD AND DEVICE FOR PARSING CONFIGURING CHANNEL STATE INFORMATION REFERENCE SIGNAL

CROSS REFERENCE TO RELATED APPLICATIONS

This is a U.S. National Stage Application, filed under 35 U.S.C. 371, of International Patent Application No. PCT/CN2016/103818, filed on Oct. 28, 2016, which claims priority to Chinese patent application No. 201510753467.8 filed on Nov. 6, 2015, contents of both of which are incorporated herein by reference in their entireties.

TECHNICAL FIELD

The present disclosure relates to the communications field, and in particular, relates to a method and device for configuring a channel state information reference signal, and a method and device for parsing a channel state information reference signal.

BACKGROUND

Long Term Evolution (LTE)/LTE-Advanced (LET-A) technology is a main trend of the 4th Generation mobile communication technology (4G). LTE/LTE-A is divided into the following two different division duplex modes: Frequency Division Duplex (FDD) and Time Division Duplex (TDD). A frame structure of FDD is referred to as Frame structure type 1, and a frame structure of TDD is referred to as Frame structure type 2.

FIG. 1 is a schematic diagram of the Frame structure type 1 in related art. As shown in FIG. 1, the Frame structure type 1 is described below. Each radio frame has a length $T_f = 307200 \times T_s = 10$ ms, and is composed of 20 slots each having a length $T_{slot} = 15360 \times T_s = 0.5$ ms. Serial numbers of the 20 slots are from 0 to 19. $T_s$ is a time unit, $T_s = 1/(15000 \times 2048)$ second. A subframe is defined to include two consecutive slots, ie, a subframe i includes slots 2i and 2i+1. For FDD, in an interval of 10 milliseconds, 10 subframes are used for a downlink transmission, 10 subframes are used for a uplink transmission, and the downlink transmission and the uplink transmission are performed at different frequencies respectively. In a half-duplex FDD, a user equipment (UE) cannot perform transmission and reception simultaneously. In the full duplex FDD, there is no such restriction.

FIG. 2 is a schematic diagram of the Frame structure type 2 in related art. As shown in FIG. 2, the Frame structure type 2 is described below. Each radio frame has a length $T_f = 307200 \times T_s = 10$ ms, and is composed of 2 half-frames. Each half-frame has a length $153600 \times T_s = 5$ ms. Each half-frame includes 5 subframes. Each subframe has a length $30720 \times T_s = 1$ ms. Each subframe is defined to include two slots, ie, a subframe i includes slots 2i and 2i+1. The slot has a length $T_{slot} = 15360 \times T_s = 0.5$ ms. $T_s$ is a time unit, $T_s = 1/(15000 \times 2048)$ second.

Changes in uplink-downlink configuration of a cell occur between frames. Uplink-downlink transmission occurs on subframes of the frames. The uplink-downlink configuration of the current frame is obtained from high level signaling.

The uplink-downlink configurations shown Table 1 have 7 types. For each subframe of a radio frame, "D" marks a downlink subframe for the downlink transmission. "U" marks an uplink subframe for the uplink transmission. "S" marks a special subframe. As shown in Table 1, the special subframe has three regions: a downlink pilot time slot (DwPTS), a guard period (GP), and a uplink pilot time slot (UpPTS).

TABLE 1

| Uplink-downlink Configuration | Downlink-to-Uplink Switch-point periodicity | 0 | 1 | 2 | 3 | 4 | 5 | 6 | 7 | 8 | 9 |
|---|---|---|---|---|---|---|---|---|---|---|---|
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

The downlink transmission of the LTE/LTE-A technology uses an Orthogonal Frequency Division Multiplexing (OFDM) modulation technology. Data is modulated on the subcarrier of frequency domain, and then is converted to time domain and added with a cyclic prefix to form a complete OFDM symbol transmitted in time domain. The cyclic prefix (CP) is used for resisting a symbol interference in time domain and an inter-subcarrier interference in frequency domain which are generated by multipath. In the LTE/LTE-A system, there are two CPs with two lengths. One is a normal cyclic prefix (NCP), and the other one is an extended cyclic prefix (ECP). The extended CP is used in a scenario where the multipath delay spread is greater. In the NCP case, a subcarrier interval is 15 kHz. In the ECP case, there are two subcarrier intervals: 15 kHz and 7.5 kHz.

Each signal transmitted in the slot is represented by one or more resource grid. The resource grid is composed of $N_{RB}^{DL} * N_{sc}^{RB}$ subcarriers and $N_{symb}^{DL}$ OFDM symbols. $N_{RB}^{DL}$ denotes the number of physical resource blocks (PRBs) or resource blocks (RBs). $N_{sc}^{RB}$ denotes the number of subcarriers in the resource blocks. $N_{RB}^{DL}$ denotes the number of OFDM symbols in the slot. Parameters of the physical resource block are illustrated in Table 2. The number of subcarriers and the number of OFDM symbols in one RB are shown in Table 2. Parameters of the OFDM symbol are illustrated in Table 3. The length of the cyclic prefix is illustrated in Table 3.

TABLE 2

| Configuration | | $N_{sc}^{RB}$ | $N_{symb}^{DL}$ |
|---|---|---|---|
| NCP | $\Delta f = 15$ kHz | 12 | 7 |
| ECP | $\Delta f = 15$ kHz |    | 6 |
|     | $\Delta f = 7.5$ kHz | 24 | 3 |

TABLE 3

| Configuration | | CP length $N_{CP, l}$ |
|---|---|---|
| NCP | $\Delta f = 15$ kHz  | 160 for l = 0 |
|     |                      | 144 for l = 1, 2, . . . , 5 |
| ECP | $\Delta f = 15$ kHz  | 512 for l = 0, 1, . . . , 5 |
|     | $\Delta f = 7.5$ kHz | 1024 for l = 0, 1, 2 |

The number $N_{RB}^{DL}$ of the physical resource blocks is determined by a downlink transmission bandwidth configured by a cell, and has a minimum value of 6 and a maximum value of 110.

PRBs in two consecutive slots of a same subframe are a same one, and are referred to as a PRB pair.

FIG. 3 is a schematic diagram of a downlink resource grid in the related art. As shown in FIG. 3, each unit in the resource grid is referred to as a resource element (RE), and labeled by an index pair (k,l), where k=0, . . . , $N_{RB}^{DL}*N_{sc}^{RB}-1$, and l=0, . . . , $N_{symb}^{DL}-1$. k denotes a sequence number of the subcarrier in the frequency domain, and l denotes a sequence number of the OFDM symbol in the time domain.

The antenna port is defined as a channel through which a symbol transmitted via this antenna port passes. The antenna port can be inferred from the channel through which other symbols are transmitted via this same port. An antenna port also is defined with a corresponding sequence number for being distinguished from other antenna ports and for indexing the antenna port.

The downlink physical channel corresponds to sets of resource elements for carrying information from upper layers. Downlink physical information includes: a Physical Downlink Shared Channel (PDSCH), a Physical Multicast Channel (PMCH), a Physical Broadcast Channel (PBCH), and a physical control format, a Physical Control Format Indicator Channel (PCFICH), a Physical Downlink Control Channel (PDCCH), a Physical Hybrid ARQ Indicator Channel (PHICH), and an enhancement Physical Downlink Control Channel (EPDCCH).

A downlink physical signal corresponds to a set of resource elements, and is used by a physical layer and is not used for carrying the information from upper layers. The downlink physical signal includes a reference signal (RS), a synchronization signal, and a discovery signal.

The reference signal is also referred to as a pilot frequency, and is of the following types: a Cell-specific Reference Signal (CRS), a Multimedia Broadcast Single Frequency Network (MB SFN) reference signal (MB SFN reference signal), a UE-specific Reference Signal (Demodulation Reference Signal (DMRS)), a Positioning reference signal, and a Channel State Information (CSI) reference signal (CSI-RS). There are two types of UE-specific reference signals: UE-specific reference signals associated with PDSCH and Demodulation reference signals associated with EPDCCH.

The channel state information reference signal (CSI-RS) is used by a terminal for predicting the channel state. The CSI-RS transmitted with non-zero power is referred to a non-zero power CSI-RS (NZP CSI-RS). Sometimes, in order to avoid interference generation, data transmission on some REs on the PDSCH needs to be avoided, so CSI-RS is transmitted with zero power, which is referred to as zero power CSI-RS (ZP CSI-RS) in this case. The corresponding set of resource elements is zero power CSI-RS resources. Sometimes, in order to measure interference, the CSI-RS is transmitted with zero power. In this case, the corresponding set of resource elements is referred to as Channel-State Information—Interference Measurement Resource (CSI-IM Resource).

CSI reference signal configuration is used for indicating the RE mapped by the CSI-RS, that is, the RE used in the CSI-RS transmission. The sequence number of the CSI-RS configuration is used for distinguishing different CSI-RS configurations. The set of REs of the CSI-RS in a configuration in which one CSI-RS is transmitted or mapped is referred to as a CSI-RS resource pattern. The CSI reference signal subframe configuration is used to indicate the subframe where the CSI-RS transmission is located.

A kind of CSI-RS configuration is a CSI-RS configuration with a certain number of antenna ports, for example, a CSI-RS configuration with an antenna port quantity of 8 and a configuration number of 0. A kind of CSI-RS resource pattern is a CSI-RS resource pattern with a certain number of antenna ports, for example, a CSI-RS resource pattern with an antenna port quantity of 8 and an index number of 0.

The set of REs of CSI-RSs transmitting or mapping a part of ports in a CSI-RS configuration is referred to as a partial port pilot resource pattern, for example, a port pilot resource pattern with port number {15, 16, 17, 18}.

An existing art supports CSI-RSs with a port quantity of 1, 2, 4, and 8, and the CSI-RS resource patterns with such port quantities are repeated on each PRB pair in the bandwidth range on the transmission subframe.

The RE sets of the CSI-RS resource patterns with different port quantities in all configuration are the same, that is, the RE set of the CSI-RS resource pattern with the port quantity of 2 in all configuration is the same as the RE set of the CSI-RS resource pattern with the port quantity of 4 in all configuration. For example, for a CSI-RS configuration which is common to the frame structure type 1 and the frame structure type 2, the RE sets of the CSI-RS resource patterns with different port quantities in all configuration are the same, and the number of REs on a PRB pair is 40.

FIG. 4 is a schematic diagram of a resource pattern of a CSI-RS with the number of ports being 4 on a RB pair in the related art. FIG. 5 is a schematic diagram of a resource pattern of a CSI-RS with the number of ports being 8 on a RB pair in the related art.

In order to make full use of power and improve the accuracy of channel measurement, the CSI-RSs of various ports are further divided into groups, that is, a group includes CSI-RSs of multiple ports, and there are one or more groups with different numbers. The CSI-RSs of each port in the group are mapped to a group of common REs in a code division multiplexing manner. For example, the number of ports in the group is N, the CSI-RS sequence is $\{r_0, r_1, \ldots, r_{N-1}\}$. There is another sequence group $\{w_0^p, w_1^p, \ldots, w_{N-1}^p\}$ of length N where p=K+0, K+1, . . . , K+N−1, and there are N sequences in the group, the sequences in the group are orthogonal to each other, that is, $\sum_{m=0}^{N-1} w_m^i w_m^j = 0$, where i, j=K+0, K+1, K+N−1, and i≠j. The CSI-RS sequence $\{r_0, r_1, \ldots, r_{N-1}\}$ modulates the sequence $\{w_0^p, w_1^p, \ldots, w_{N-1}^p\}$ to obtain the CSI-RS sequence $\{r_0 w_0^p, r_1 w_1^p, \ldots, r_{N-1} w_{N-1}^p\}$ of the port p, which corresponds to a group of common REs, and each element in the CSI-RS sequence of the port p is mapped to the REs one by one, where N is the length of multiplexing.

In an existing art, the CSI-RS multiplexing between ports is mapped to the RE in the following manner: ports are divided into groups, for example, ports are divided into four groups: {15, 16}, {17, 18}, {19, 20}, {21, 22}; the frequency division manners among these four groups are multiplexed on RE, and the CSI-RSs on the ports in the groups multiplexed to the REs in the time domain by code division, for example, the CSI-RS of the port 15 and the CSI-RS of the port 16 are multiplexed in the time domain in code division manner.

The base station informs the terminal of information of CSI-RS resource through upper layer signaling. The information includes CSI-RS resource configuration identity, the number of CSI-RS ports, CSI-RS configuration, and CSI-RS subframe configuration.

The CRS can be used not only for the measurement of the channel state but also for receiving the estimation of the channel coefficient during demodulation. However, as the number of ports increases, the overhead increases drastically. Therefore, when the number of ports is 8, the CRS is no longer used to measure the channel state, and the CSI-RS with low pilot density and low overhead is used instead. However, with the development of technologies and requirements, there is a need to further develop technologies for a larger number of antenna-terminated applications, such as the number of ports of 12, 16, and the like, which involves the channel state measurement of these larger numbers of ports. The current method of transmitting the channel measurement pilot with a large number of ports is aggregating multiple measurement pilots with small number of ports. For example, CSI-RS using K N-ports aggregates CSI-RS of K*N ports, where * is a multiplication sign. For example, (N, K)=(8,2) aggregates the CSI-RS of 16 ports.

However, after aggregation, the sorting rule of the reference signal ports or the reference signal port numbers has a great influence on the performance of channel measurement feedback. The position relationship or polarization property relationship between the antenna ports is different, and the corresponding channel coefficient relationship characteristics are not the same. The relationship between the codeword elements reflects the relationship between the port channel coefficients and also reflects the position relationship or polarization property relationship between antenna ports.

With respect to the above problems in related technologies, there is currently no effective solution.

SUMMARY

The present disclosure provides a method and device for configuring a channel state information reference signal, and a method and device for parsing a channel state information reference signal so as to at least solve the problem in the related art in the related art that the position relationships or the polarization property relationships between antenna ports are not the same.

According to a first aspect of embodiments of the present disclosure, a method for configuring a channel state information reference signal is provided. The method includes: configuring configuration information of the CSI-RS by a base station; generating a signaling carrying the configuration information of the CSI-RS by the base station; and transmitting the signaling by the base station. The configuration information includes at least one of: a number of CSI-RS ports, a number K of components of a pilot resource pattern, a number N of ports of the components of the pilot resource pattern, and a CSI-RS port-numbering mode, where the CSI-RS port-numbering mode includes M types of candidate port-numbering mode, and M, K, and N are positive integers.

Optionally, (N, K) has Q candidate values, the Q candidate values are divided into X sets, a type of the CSI-RS port-numbering mode is selected based on one of the X sets to which the (N, K) belongs, the (N, K) denotes a number pair composed of a value of N and a value of K, and Q and X are integers greater than 1.

Optionally, the X sets into which the Q candidate values are divided include: a first set using a first type of CSI-RI port-numbering mode, a second set using a second type of CSI-RS port-numbering mode, and a third set using the first type of CSI-RS port-numbering mode or the second type of CSI-RS port-numbering mode, and the first type of CSI-RS port-numbering mode is different from the second type of CSI-RS port-numbering mode.

Optionally, the configuration information further includes a code division multiplexing mode between ports, types of the code division multiplexing mode include: a first type of code division multiplexing mode and a second type of code division multiplexing mode, where the first type of code division multiplexing mode uses a first type of CSI-RS port-numbering mode, the second type of code division multiplexing mode uses a second type of CSI-RS port-numbering mode, the first type of code division multiplexing mode is different from the second type of code division multiplexing mode, and the first type of CSI-RS port-numbering mode is different from the second type of CSI-RS port-numbering mode.

Optionally, the first type of code division multiplexing mode is a code division multiplexing mode with a multiplexing length of 2, and the second type of code division multiplexing mode is a code division multiplexing mode with a multiplexing length of 4.

Optionally, the first type of code division multiplexing mode is a code division multiplexing mode in time domain, and the second type of code division multiplexing mode is a code division multiplexing mode in both of time domain and frequency domain.

Optionally, the first type of code division multiplexing mode is a code division multiplexing mode on consecutive subcarriers, and the second type of code division multiplexing mode is a code division multiplexing mode on separated subcarriers.

Optionally, the configuration information further includes: a grouping mode of code division multiplexed ports, the grouping mode of code division multiplexed ports includes U candidate modes, the U candidate modes are divided into Y sets, a type of the CSI-RS port-numbering mode is selected based one of the Y sets to which the grouping mode of code division multiplexed ports belongs, and U and Y are integers greater than 1.

Optionally, the Y sets include a first set using a first type of CSI-RS port-numbering mode, a second set using a second type of CSI-RS port-numbering mode, and a third set using the first type of CSI-RS port-numbering mode or the second type of CSI-RS port-numbering mode, and the first type of CSI-RS port-numbering mode is different from the second type of CSI-RS port-numbering mode.

Optionally, the candidate port-numbering modes include: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter.

Optionally, the candidate port-numbering modes are determined according to a mapping relationship of a following function:

$$p_{T_{port}} = k * \left(\frac{N}{2}\right) + p_{N_{port\_k}} + \frac{N*(K-1)}{2} * u\left(p_{N_{port\_k}} - \frac{N}{2}\right),$$

$$u(n) = \begin{cases} 1, n \geq 0 \\ 0, n < 0 \end{cases}$$

where $p_{T_{port}}$ denotes a port number of a CSI-RS having T ports, k denotes a sequence number of a component, $p_{N_{port\_k}}$ denotes a port number in a CSI-RS of a kth component, the number of ports in the CSI-RS of the kth component is N, the value of k ranges from 0 to N−1, and N is an integer greater than 1.

Optionally, the candidate port-numbering modes include: ports of each of the components are successively arranged in the aggregated CSI-RS.

Optionally, the candidate port-numbering modes are determined according to a mapping relationship of a following function:

$$p_{Tport} = k*N + p_{Nport\_k}$$

where $p_{Tport}$ denotes a port number of a CSI-RS having T ports, k denotes a sequence number of a component, $p_{Nport\_k}$ denotes a port number in a CSI-RS of the kth component, the number of ports in the CSI-RS of the kth component is N, the value of k ranges from 0 to N−1, and N is an integer greater than 1.

Optionally, the candidate port-numbering modes include: exchanging positions of a 17th port and a 19th port for each of the components, exchanging positions of a 18th port and a 20th port for each of the components, and arranging the components according to sequence numbers thereof in an ascending order.

Optionally, the candidate port-numbering modes are determined according to a mapping relationship of a following function:

$$p_{Tport} = k*N + p_{Nport\_k} + 2*\delta(p_{Nport\_k} - 17) +$$
$$2*\delta(p_{Nport\_k} - 18) - 2*\delta(p_{Nport\_k} - 19) - 2*\delta(p_{Nport\_k} - 20)$$
$$\delta(n) = \begin{cases} 1, & n = 0 \\ 0, & n \neq 0 \end{cases}$$

where $p_{Tport}$ denotes a port number of a CSI-RS having T ports, k denotes a sequence number of a component, $p_{Nport\_k}$ denotes a port number in a CSI-RS of the kth component, the number of ports in the CSI-RS of the kth component is N, the value of k ranges from 0 to N−1, and N is an integer greater than 1.

Optionally, a port-numbering mode indicated by a value of (N, K) being (8, 2) is as follow: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter, where (N, K) denotes a number pair composed of values of N and K.

Optionally, the candidate port-numbering modes are determined according to a mapping relationship of a following function:

$$p_{Tport} = k*\left(\frac{N}{2}\right) + p_{Nport\_k} + \frac{N*(K-1)}{2}*u\left(p_{Nport\_k} - \frac{N}{2}\right),$$
$$u(n) = \begin{cases} 1, & n \geq 0 \\ 0, & n < 0 \end{cases}$$

where $p_{Tport}$ denotes a port number of a CSI-RS having T ports, k denotes a sequence number of a component, $p_{Nport\_k}$ denotes a port number in a CSI-RS of the kth component, the number of ports in the CSI-RS of the kth component is N, the value of k ranges from 0 to N−1, and N is an integer greater than 1.

Optionally, a port-numbering mode indicated by a value of (N, K) being (8, 2) or (2, 6) is as follow: ports of each of the components are successively arranged in an aggregated CSI-RS, where (N, K) denotes a number pair composed of values of N and K.

Optionally, the candidate port-numbering modes are determined according to a mapping relationship of a following function:

$$p_{Tport} = k*N + p_{Nport\_k}$$

where $p_{Tport}$ denotes a port number of a CSI-RS having T ports, k denotes a sequence number of a component, $p_{Nport\_k}$ denotes a port number in a CSI-RS of the kth component, the number of ports in the CSI-RS of the kth component is N, the value of k ranges from 0 to N−1, and N is an integer greater than 1.

Optionally, the configuration information further includes an inter-port code division multiplexing length, a type of candidate port-numbering mode indicated by an inter-port code division multiplexing length of 4 is as follow: exchanging positions of a 17th port and a 19th port for each of the components, exchanging positions of a 18th port and a 20th port for each of the components, and arranging the components according to sequence numbers thereof in an ascending order.

Optionally, the candidate port-numbering modes are determined according to a mapping relationship of a following function:

$$p_{Tport} = k*N + p_{Nport\_k} + 2*\delta(p_{Nport\_k} - 17) +$$
$$2*\delta(p_{Nport\_k} - 18) - 2*\delta(p_{Nport\_k} - 19) - 2*\delta(p_{Nport\_k} - 20)$$
$$\delta(n) = \begin{cases} 1, & n = 0 \\ 0, & n \neq 0 \end{cases}$$

where $p_{Tport}$ denotes a port number of a CSI-RS having T ports, k denotes a sequence number of a component, $p_{Nport\_k}$ denotes a port number in a CSI-RS of the kth component, the number of ports in the CSI-RS of the kth component is N, the value of k ranges from 0 to N−1, and N is an integer greater than 1.

Optionally, the configuration information further includes: a grouping mode of code division multiplexed ports, the M types of CSI-RS-port-numbering mode are divided into E sets, a type of the grouping mode of code division multiplexed ports is selected based on one of the E sets to which a selected CSI-RS-port-numbering mode belongs, where E is an integer greater than 1.

Optionally, a number of the E sets of the M types of CSI-RS-port-numbering mode is 3, the 3 sets include: a first set using a first type of grouping mode of code division multiplexed ports, a second set using a second type of grouping mode of code division multiplexed ports, and a third set using the first type of grouping mode of code division multiplexed ports or the second type of grouping mode of code division multiplexed ports, where the first type of grouping mode of code division multiplexed ports is different from the second type of grouping mode of code division multiplexed ports.

Optionally, the configuration information further includes: a grouping mode of code division multiplexed ports, where a candidate type of the grouping mode of code division multiplexed ports includes: in a same group, differences between two port numbers which have maximum sequence numbers and two port numbers which have minimum sequence numbers are $$\frac{k*N}{2}.$$

Optionally, a candidate type of the grouping mode of code division multiplexed ports includes: in a same group, one port number is:

$$\left\{(15, 16), (15, 16) + \frac{k*N}{2}\right\} + m*2, m = 0, 1, 2, 3,$$

where m is a sequence number for distinguishing different groups.

Optionally, the configuration information further includes: a grouping mode of code division multiplexed ports, where a candidate type of the grouping mode of code division multiplexed ports includes: in a same group, differences between two port numbers which have larger sequence numbers and two port numbers which have smaller sequence numbers are 4.

Optionally, a candidate type of the grouping mode of code division multiplexed ports includes: in a same group, one port number is:

{(15, 16), (15, 16)+4}+m+k*N, m=0, 2, where m is a sequence number for distinguishing different groups, k is a sequence number for distinguishing components of an aggregated CSI-RS, and a value of k is 1 or 0.

Optionally, the configuration information further includes: a grouping mode of code division multiplexed ports, the grouping mode of code division multiplexed ports includes a candidate type of the grouping mode of code division multiplexed ports, in which sequence numbers of ports in a same group are consecutive.

Optionally, a candidate grouping mode of code division multiplexed ports includes in a same group, one port number is:

{15, 16, 17, 18}+4*m, m=0, 1, 2, 3, where m is a sequence number for distinguishing different groups.

According to another aspect of the present disclosure, provided is a method for parsing a channel state information reference signal (CSI-RS). The method includes: receiving, by a terminal, a signaling transmitted by a base station, where the signaling carries configuration information of the CSI-RS configured by the base station; and parsing the configuration information by the terminal. The configuration information includes at least one of: a number of CSI-RS ports, a number K of components of a pilot resource pattern, a number N of ports of the components of the pilot resource pattern, and a CSI-RS port-numbering mode. The CSI-RS port-numbering mode includes M types of candidate port-numbering mode, and M, K, and N are positive integers.

Optionally, (N, K) has Q candidate values, the Q candidate values are divided into X sets, a type of the CSI-RS port-numbering mode is selected based on one of the X sets to which the (N, K) belongs, the (N, K) denotes a number pair composed of a value of N and a value of K, and Q and X are integers greater than 1.

Optionally, the X sets into which the Q candidate values are divided include: a first set using a first type of CSI-RI port-numbering mode, a second set using a second type of CSI-RS port-numbering mode, and a third set using the first type of CSI-RS port-numbering mode or the second type of CSI-RS port-numbering mode, and the first type of CSI-RS port-numbering mode is different from the second type of CSI-RS port-numbering mode.

Optionally, the configuration information further includes a code division multiplexing mode between ports, types of the code division multiplexing mode include: a first type of code division multiplexing mode and a second type of code division multiplexing mode, where the first type of code division multiplexing mode uses a first type of CSI-RS port-numbering mode, the second type of code division multiplexing mode uses a second type of CSI-RS port-numbering mode, the first type of code division multiplexing mode is different from the second type of code division multiplexing mode, and the first type of CSI-RS port-numbering mode is different from the second type of CSI-RS port-numbering mode.

Optionally, the first type of code division multiplexing mode is a code division multiplexing mode with a multiplexing length of 2, and the second type of code division multiplexing mode is a code division multiplexing mode with a multiplexing length of 4.

Optionally, the first type of code division multiplexing mode is a code division multiplexing mode in time domain, and the second type of code division multiplexing mode is a code division multiplexing mode in both of time domain and frequency domain.

Optionally, the first type of code division multiplexing mode is a code division multiplexing mode on consecutive subcarriers, and the second type of code division multiplexing mode is a code division multiplexing mode on separated subcarriers.

Optionally, the configuration information further includes: a grouping mode of code division multiplexed ports, the grouping mode of code division multiplexed ports includes U candidate modes, the U candidate modes are divided into Y sets, a type of the CSI-RS port-numbering mode is selected based one of the Y sets to which the grouping mode of code division multiplexed ports belongs, and U and Y are integers greater than 1.

Optionally, the Y sets include a first set using a first type of CSI-RS port-numbering mode, a second set using a second type of CSI-RS port-numbering mode, and a third set using the first type of CSI-RS port-numbering mode or the second type of CSI-RS port-numbering mode, and the first type of CSI-RS port-numbering mode is different from the second type of CSI-RS port-numbering mode.

Optionally, the candidate port-numbering modes include: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter.

Optionally, the candidate port-numbering modes are determined according to a mapping relationship of a following function:

$$p_{T_{port}} = k*\left(\frac{N}{2}\right) + p_{N_{port\_k}} + \frac{N*(K-1)}{2}*u\left(p_{N_{port\_k}} - \frac{N}{2}\right),$$

$$u(n) = \begin{cases} 1, n \geq 0 \\ 0, n < 0 \end{cases}$$

where $p_{T_{port}}$ denotes a port number of a CSI-RS having T ports, k denotes a sequence number of a component, $p_{N_{port\_k}}$ denotes a port number in a CSI-RS of a kth component, the number of ports in the CSI-RS of the kth component is N, the value of k ranges from 0 to N−1, and N is an integer greater than 1.

Optionally, the candidate port-numbering modes include: ports of each of the components are successively arranged in the aggregated CSI-RS.

Optionally, the candidate port-numbering modes are determined according to a mapping relationship of a following function:

$$p_{Tport} = k*N + p_{Nport\_k}$$

where $p_{Tport}$ denotes a port number of a CSI-RS having T ports, k denotes a sequence number of a component, $p_{Nport\_k}$ denotes a port number in a CSI-RS of the kth component, the number of ports in the CSI-RS of the kth component is N, the value of k ranges from 0 to N−1, and N is an integer greater than 1.

Optionally, the candidate port-numbering modes include: exchanging positions of a 17th port and a 19th port for each of the components, exchanging positions of a 18th port and a 20th port for each of the components, and arranging the components according to sequence numbers thereof in an ascending order.

Optionally, the candidate port-numbering modes are determined according to a mapping relationship of a following function:

$$p_{Tport} = k*N + p_{Nport\_k} + 2*\delta(p_{Nport\_k} - 17) + \\ 2*\delta(p_{Nport\_k} - 18) - 2*\delta(p_{Nport\_k} - 19) - 2*\delta(p_{Nport\_k} - 20)$$

$$\delta(n) = \begin{cases} 1, & n = 0 \\ 0, & n \neq 0 \end{cases}$$

where $p_{Tport}$ denotes a port number of a CSI-RS having T ports, k denotes a sequence number of a component, $p_{Nport\_k}$ denotes a port number in a CSI-RS of the kth component, the number of ports in the CSI-RS of the kth component is N, the value of k ranges from 0 to N−1, and N is an integer greater than 1.

Optionally, a port-numbering mode indicated by a value of (N, K) being (8, 2) is as follow: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter, where (N, K) denotes a number pair composed of values of N and K.

Optionally, the candidate port-numbering modes are determined according to a mapping relationship of a following function:

$$p_{Tport} = k*\left(\frac{N}{2}\right) + p_{Nport\_k} + \frac{N*(K-1)}{2}*u\left(p_{Nport\_k} - \frac{N}{2}\right),$$

$$u(n) = \begin{cases} 1, n \geq 0 \\ 0, n < 0 \end{cases}$$

where $p_{Tport}$ denotes a port number of a CSI-RS having T ports, k denotes a sequence number of a component, $p_{Nport\_k}$ denotes a port number in a CSI-RS of the kth component, the number of ports in the CSI-RS of the kth component is N, the value of k ranges from 0 to N−1, and N is an integer greater than 1.

Optionally, a port-numbering mode indicated by a value of (N, K) being (8, 2) or (2, 6) is as follow: ports of each of the components are successively arranged in an aggregated CSI-RS, where (N, K) denotes a number pair composed of values of N and K.

Optionally, the candidate port-numbering modes are determined according to a mapping relationship of a following function:

$$p_{Tport} = k*N + p_{Nport\_k}$$

where $p_{Tport}$ denotes a port number of a CSI-RS having T ports, k denotes a sequence number of a component, $p_{Nport\_k}$ denotes a port number in a CSI-RS of the kth component, the number of ports in the CSI-RS of the kth component is N, the value of k ranges from 0 to N−1, and N is an integer greater than 1.

Optionally, the configuration information further includes an inter-port code division multiplexing length, a type of candidate port-numbering mode indicated by an inter-port code division multiplexing length of 4 is as follow: exchanging positions of a 17th port and a 19th port for each of the components, exchanging a position of a 18th port and a 20th port for each of the components, and arranging the components according to sequence numbers thereof in an ascending order.

Optionally, the candidate port-numbering modes are determined according to a mapping relationship of a following function:

$$p_{Tport} = k*N + p_{Nport\_k} + 2*\delta(p_{Nport\_k} - 17) + \\ 2*\delta(p_{Nport\_k} - 18) - 2*\delta(p_{Nport\_k} - 19) - 2*\delta(p_{Nport\_k} - 20)$$

$$\delta(n) = \begin{cases} 1, & n = 0 \\ 0, & n \neq 0 \end{cases}$$

where $p_{Tport}$ denotes a port number of a CSI-RS having T ports, k denotes a sequence number of a component, $p_{Nport\_k}$ denotes a port number in a CSI-RS of the kth component, the number of ports in the CSI-RS of the kth component is N, the value of k ranges from 0 to N−1, and N is an integer greater than 1.

Optionally, the configuration information further includes: a grouping mode of code division multiplexed ports, the M types of CSI-RS-port-numbering mode are divided into E sets, a type of the grouping mode of code division multiplexed ports is selected based on one of the E sets to which a selected CSI-RS-port-numbering mode belongs, where E is an integer greater than 1.

Optionally, a number of the E sets of the M types of CSI-RS-port-numbering modes is 3, the 3 sets include: a first set using a first type of grouping mode of code division multiplexed ports, a second set using a second type of grouping mode of code division multiplexed ports, and a third set using the first type of grouping mode of code division multiplexed ports or the second type of grouping mode of code division multiplexed ports, where the first type of grouping mode of code division multiplexed ports is different from the second type of grouping mode of code division multiplexed ports.

Optionally, the configuration information further includes: a grouping mode of code division multiplexed ports, where a candidate type of the grouping mode of code division multiplexed ports includes: in a same group, differences between two maximum port numbers and two minimum port numbers are $$\frac{k*N}{2}.$$

Optionally, the candidate type of the grouping mode of code division multiplexed ports includes: in a same group, one port number is:

$$\left\{(15,16),(15,16)+\frac{k*N}{2}\right\}+m*2, m=0,1,2,3,$$

where m is a sequence number for distinguishing different groups.

Optionally, the configuration information further includes: a grouping mode of code division multiplexed ports, where a candidate type of the grouping mode of code division multiplexed ports includes: in a same group, differences between two larger port numbers and two smaller port numbers are 4.

Optionally, the candidate type of the grouping mode of code division multiplexed ports includes: in a same group, one port number is:

{(15, 16), (15, 16)+4}+m+k*N, m=0, 2, where m is a sequence number for distinguishing different groups, k is a sequence number for distinguishing components of an aggregated CSI-RS, and a value of k is 1 or 0.

Optionally, the configuration information further includes: a grouping mode of code division multiplexed ports, the grouping mode of code division multiplexed ports includes a candidate type of the grouping mode of code division multiplexed ports, in which port numbers in a same group are consecutive.

Optionally, the candidate grouping mode of code division multiplexed ports includes: in a same group, one port number is:

{15, 16, 17, 18}+4*m, m=0, 1, 2, 3, where m is a sequence number for distinguishing different groups.

According to yet another aspect of embodiments of the present disclosure, provided is a device for configuring a channel state information reference signal (CSI-RS) applied to a base station side. The device includes: a configuration module configured to configure configuration information of the CSI-RS; a generation module configured to generate a signaling carrying the configuration information of the CSI-RS; and a transmission module configured to transmit the signaling. The configuration information includes at least one of: a number of CSI-RS ports, a number K of components of a pilot resource pattern, a number N of ports of the components of the pilot resource pattern, and a CSI-RS port-numbering mode. The CSI-RS port-numbering mode includes M types of candidate port-numbering mode, and M, K, and N are positive integers.

Optionally, (N, K) has Q candidate values, the Q candidate values are divided into X sets, a type of the CSI-RS port-numbering mode is selected based on one of the X sets to which the (N, K) belongs, the (N, K) denotes a number pair composed of a value of N and a value of K, and Q and X are integers greater than 1.

Optionally, the X sets into which the Q candidate values are divided comprise: a first set using a first type of CSI-RI port-numbering mode, a second set using a second type of CSI-RS port-numbering mode, and a third set using the first type of CSI-RS port-numbering mode or the second type of CSI-RS port-numbering mode, and the first type of CSI-RS port-numbering mode is different from the second type of CSI-RS port-numbering mode.

Optionally, the configuration information further includes a code division multiplexing mode between ports, types of the code division multiplexing mode comprise: a first type of code division multiplexing mode and a second type of code division multiplexing mode. The first type of code division multiplexing mode uses a first type of CSI-RS port-numbering mode, the second type of code division multiplexing mode uses a second type of CSI-RS port-numbering mode, the first type of code division multiplexing mode is different from the second type of code division multiplexing mode, and the first type of CSI-RS port-numbering mode is different from the second type of CSI-RS port-numbering mode.

Optionally, the configuration information further includes: a grouping mode of code division multiplexed ports, the grouping mode of code division multiplexed ports includes U candidate modes, the U candidate modes are divided into Y sets, a type of the CSI-RS port-numbering mode is selected based one of the Y sets to which the grouping mode of code division multiplexed ports belongs, and U and Y are integers greater than 1.

Optionally, the Y sets comprise a first set using a first type of CSI-RS port-numbering mode, a second set using a second type of CSI-RS port-numbering mode, and a third set using the first type of CSI-RS port-numbering mode or the second type of CSI-RS port-numbering mode, and the first type of CSI-RS port-numbering mode is different from the second type of CSI-RS port-numbering mode.

Optionally, the candidate port-numbering modes comprise: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter.

Optionally, the candidate port-numbering modes comprise: ports of each of the components are successively arranged in the aggregated CSI-RS.

Optionally, the candidate port-numbering modes comprise: exchanging positions of a 17th port and a 19th port for each of the components, exchanging positions of a 18th port and a 20th port for each of the components, and arranging the components according to sequence numbers thereof in an ascending order.

Optionally, a port-numbering mode indicated by a value of (N, K) being (8, 2) is as follow: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter, where (N, K) denotes a number pair composed of values of N and K.

Optionally, a port-numbering mode indicated by a value of (N, K) being (8, 2) or (2, 6) is as follow: ports of each of the components are successively arranged in an aggregated CSI-RS, where (N, K) denotes a number pair composed of values of N and K.

Optionally, the configuration information further includes an inter-port code division multiplexing length, a type of candidate port-numbering mode indicated by an inter-port code division multiplexing length of 4 is as follow: exchanging positions of a 17th port and a 19th port for each of the components, exchanging a position of a 18th port and a 20th port for each of the components, and arranging the components according to sequence numbers thereof in an ascending order.

Optionally, the configuration information further includes: a grouping mode of code division multiplexed ports, the M types of CSI-RS-port-numbering mode are divided into E sets, a type of the grouping mode of code division multiplexed ports is selected based on one of the E sets to which a selected CSI-RS-port-numbering mode belongs, where E is an integer greater than 1.

Optionally, a number of the E sets of the M types of CSI-RS-port-numbering mode is 3, the 3 sets comprise: a first set using a first type of grouping mode of code division multiplexed ports, a second set using a second type of grouping mode of code division multiplexed ports, and a third set using the first type of grouping mode of code division multiplexed ports or the second type of grouping mode of code division multiplexed ports. The first type of grouping mode of code division multiplexed ports is different from the second type of grouping mode of code division multiplexed ports.

Optionally, the configuration information further includes: a grouping mode of code division multiplexed ports. A candidate type of the grouping mode of code division multiplexed ports includes: in a same group, differences between two port numbers which have maximum sequence numbers and two port numbers which have minimum sequence numbers are $$\frac{k*N}{2}.$$

Optionally, the configuration information further includes: a grouping mode of code division multiplexed ports. The candidate type of the grouping mode of code division multiplexed ports includes: in a same group, differences between two port numbers which have larger sequence numbers and two port numbers which have smaller sequence numbers are 4.

Optionally, the configuration information further includes: a grouping mode of code division multiplexed ports, the grouping mode of code division multiplexed ports includes a candidate type of the grouping mode of code division multiplexed ports, in which sequence numbers of ports in a same group are consecutive.

According to yet another aspect of embodiments of the present disclosure, provided is a device for parsing a channel state information reference signal (CSI-RS) applied to a terminal side. The device includes: a reception module configured to receive a signaling that is transmitted by a base station, where the signaling carries configuration information of the CSI-RS that is configured by the base station; and a parsing module configured to parse the configuration information. The configuration information includes at least one of: a number of CSI-RS ports, a number K of components of a pilot resource pattern, a number N of ports of the components of the pilot resource pattern, and a CSI-RS port-numbering mode. The CSI-RS port-numbering mode includes M types of candidate port-numbering mode, and M, K, and N are positive integers.

Optionally, (N, K) has Q candidate values, the Q candidate values are divided into X sets, a type of the CSI-RS port-numbering mode is selected based on one of the X sets to which the (N, K) belongs, the (N, K) denotes a number pair composed of a value of N and a value of K, and Q and X are integers greater than 1.

Optionally, the X sets into which the Q candidate values are divided comprise: a first set using a first type of CSI-RI port-numbering mode, a second set using a second type of CSI-RS port-numbering mode, and a third set using the first type of CSI-RS port-numbering mode or the second type of CSI-RS port-numbering mode, and the first type of CSI-RS port-numbering mode is different from the second type of CSI-RS port-numbering mode.

Optionally, the configuration information further includes a code division multiplexing mode between ports, types of the code division multiplexing mode comprise: a first type of code division multiplexing mode and a second type of code division multiplexing mode. The first type of code division multiplexing mode uses a first type of CSI-RS port-numbering mode, the second type of code division multiplexing mode uses a second type of CSI-RS port-numbering mode, the first type of code division multiplexing mode is different from the second type of code division multiplexing mode, and the first type of CSI-RS port-numbering mode is different from the second type of CSI-RS port-numbering mode.

Optionally, the configuration information further includes: a grouping mode of code division multiplexed ports, the grouping mode of code division multiplexed ports includes U candidate modes, the U candidate modes are divided into Y sets, a type of the CSI-RS port-numbering mode is selected based one of the Y sets to which the grouping mode of code division multiplexed ports belongs, and U and Y are integers greater than 1.

Optionally, the Y sets comprise a first set using a first type of CSI-RS port-numbering mode, a second set using a second type of CSI-RS port-numbering mode, and a third set using the first type of CSI-RS port-numbering mode or the second type of CSI-RS port-numbering mode, and the first type of CSI-RS port-numbering mode is different from the second type of CSI-RS port-numbering mode.

Optionally, the candidate port-numbering modes comprise: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter.

Optionally, the candidate port-numbering modes comprise: ports of each of the components are successively arranged in the aggregated CSI-RS.

Optionally, the candidate port-numbering modes comprise: exchanging positions of a 17th port and a 19th port for each of the components, exchanging positions of a 18th port and 20th port for each of the components, and arranging the components according to sequence numbers thereof in an ascending order.

Optionally, a port-numbering mode indicated by a value of (N, K) being (8, 2) is as follow: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter, where (N, K) denotes a number pair composed of values of N and K.

Optionally, a port-numbering mode indicated by a value of (N, K) being (8, 2) or (2, 6) is as follow: ports of each of the components are successively arranged in an aggregated CSI-RS, where (N, K) denotes a number pair composed of values of N and K.

Optionally, the configuration information further includes an inter-port code division multiplexing length, a type of candidate port-numbering mode indicated by an inter-port code division multiplexing length of 4 is as follow: exchanging positions of a 17th port and a 19th port for each of the components, exchanging positions of a 18th port and a 20th port for each of the components, and arranging the components according to sequence numbers thereof in an ascending order.

Optionally, the configuration information further includes: a grouping mode of code division multiplexed ports, the M types of CSI-RS-port-numbering mode are divided into E sets, a type of the grouping mode of code division multiplexed ports is selected based on one of the E sets to which a selected CSI-RS-port-numbering mode belongs, where E is an integer greater than 1.

Optionally, a number of the E sets of the M types of CSI-RS-port-numbering mode is 3, the 3 sets comprise: a first set using a first type of grouping mode of code division multiplexed ports, a second set using a second type of grouping mode of code division multiplexed ports, and a third set using the first type of grouping mode of code division multiplexed ports or the second type of grouping mode of code division multiplexed ports. The first type of grouping mode of code division multiplexed ports is different from the second type of grouping mode of code division multiplexed ports.

Optionally, the configuration information further includes: a grouping mode of code division multiplexed ports. A candidate type of the grouping mode of code division multiplexed ports includes: in a same group, differences between two port numbers which have maximum sequence numbers and two port numbers which have minimum sequence numbers are $$\frac{k*N}{2}.$$

Optionally, the configuration information further includes: a grouping mode of code division multiplexed ports. The candidate type of the grouping mode of code division multiplexed ports includes: in a same group, differences between two port numbers which have larger sequence numbers and two port numbers which have smaller sequence numbers are 4.

Optionally, the configuration information further includes: a grouping mode of code division multiplexed ports, the grouping mode of code division multiplexed ports includes a candidate type of the grouping mode of code division multiplexed ports, in which sequence numbers of ports in a same group are consecutive.

According to embodiments of the present disclosure, the configured configuration information of the CSI-RS is transmitted by the base station through the signaling. The configuration information includes at least one of: the number of pilot ports after aggregation, a number K of components of a pilot resource pattern, a number N of ports of the components of the pilot resource pattern, and a CSI-RS port-numbering mode. That is, by configuring the port pairing number composed of N and K and the CSI-RS port-numbering mode, the reference number of the port and the port position represented by the code-book element are consistent with the polarization property, thereby solving a problem in the related art that the serial numbers or the sequence of antenna ports are unable to reflect the positional relationship and polarization property relationship of antennas in actual topology relationships, thereby improving the feedback channel precision and making full use of the signal transmission power.

BRIEF DESCRIPTION OF DRAWINGS

The accompanying drawings described herein are used to provide a further understanding of the present disclosure, and form a part of the present disclosure. The illustrative embodiments and descriptions thereof in the present disclosure are used to explain the present disclosure, and do not form improper limits to the present disclosure. In the accompanying drawings.

DETAILED DESCRIPTION

Hereinafter, the present disclosure will be described in detail with reference to the accompanying drawings and in conjunction with the embodiments. It should be noted that the embodiments in the present disclosure and the features in the embodiments can be combined with each other without conflict.

It should be noted that the terms "first", "second", and the like in the description and claims of the present disclosure and the above-mentioned drawings are used to distinguish similar objects and do not necessarily describe a particular order or sequence.

Figure 1:
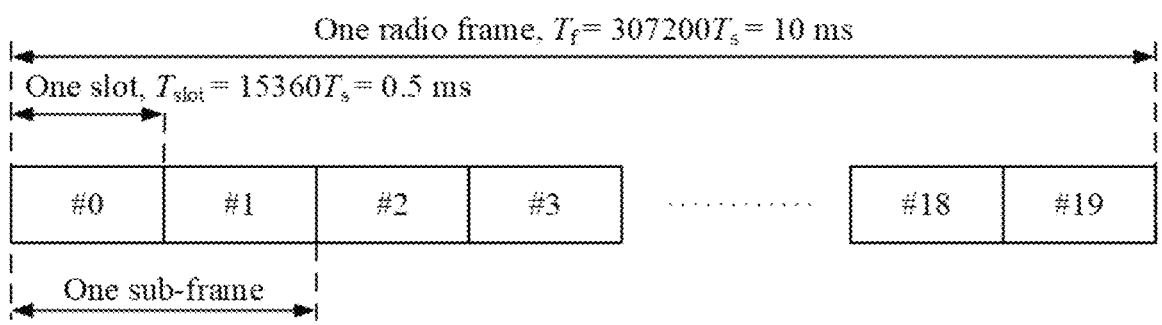
FIG. 1 is a schematic diagram of a frame structure type 1 in related art.
Figure 2:
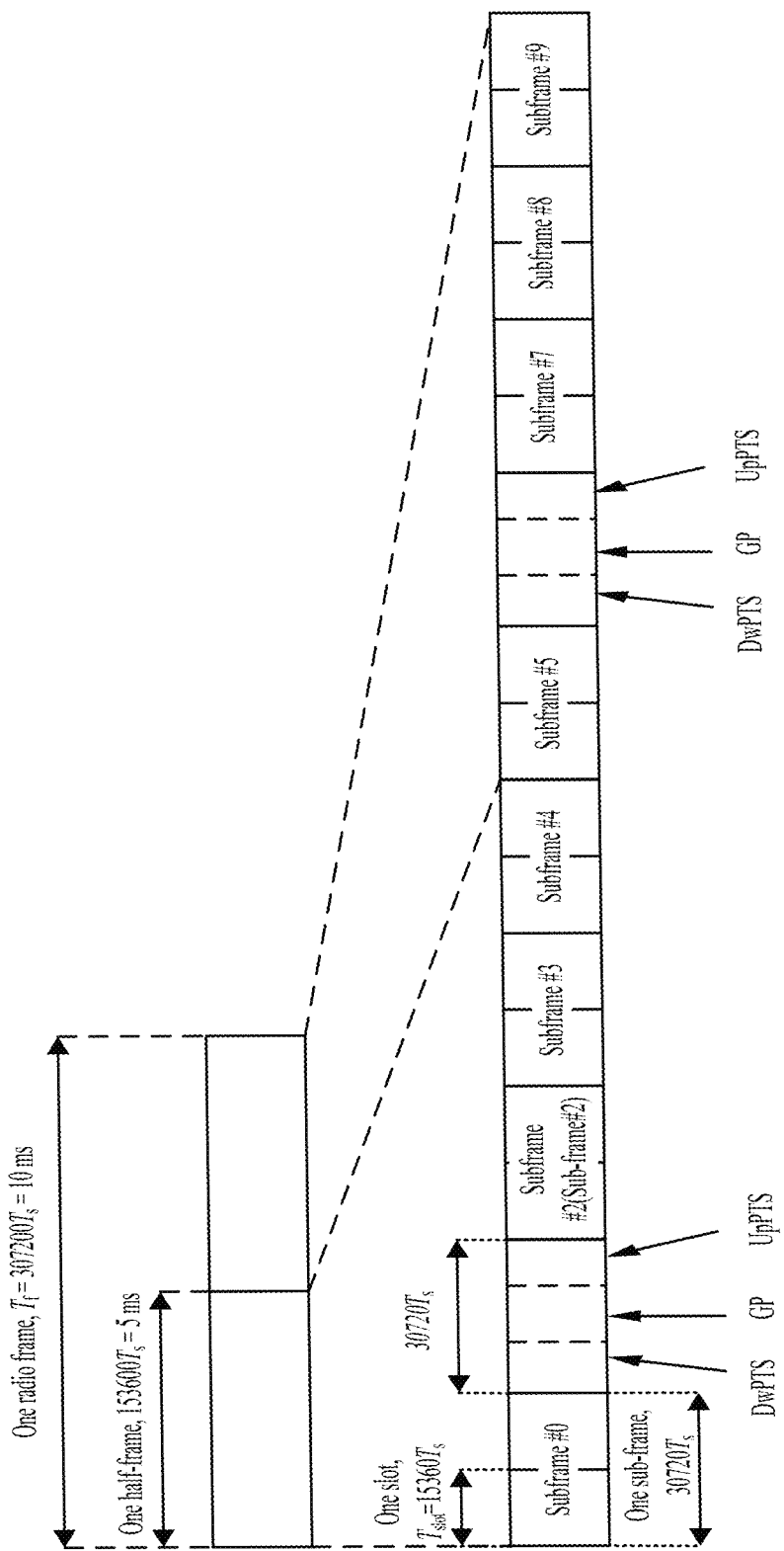
FIG. 2 is a schematic diagram of a frame structure type 2 in related art.
Figure 3:
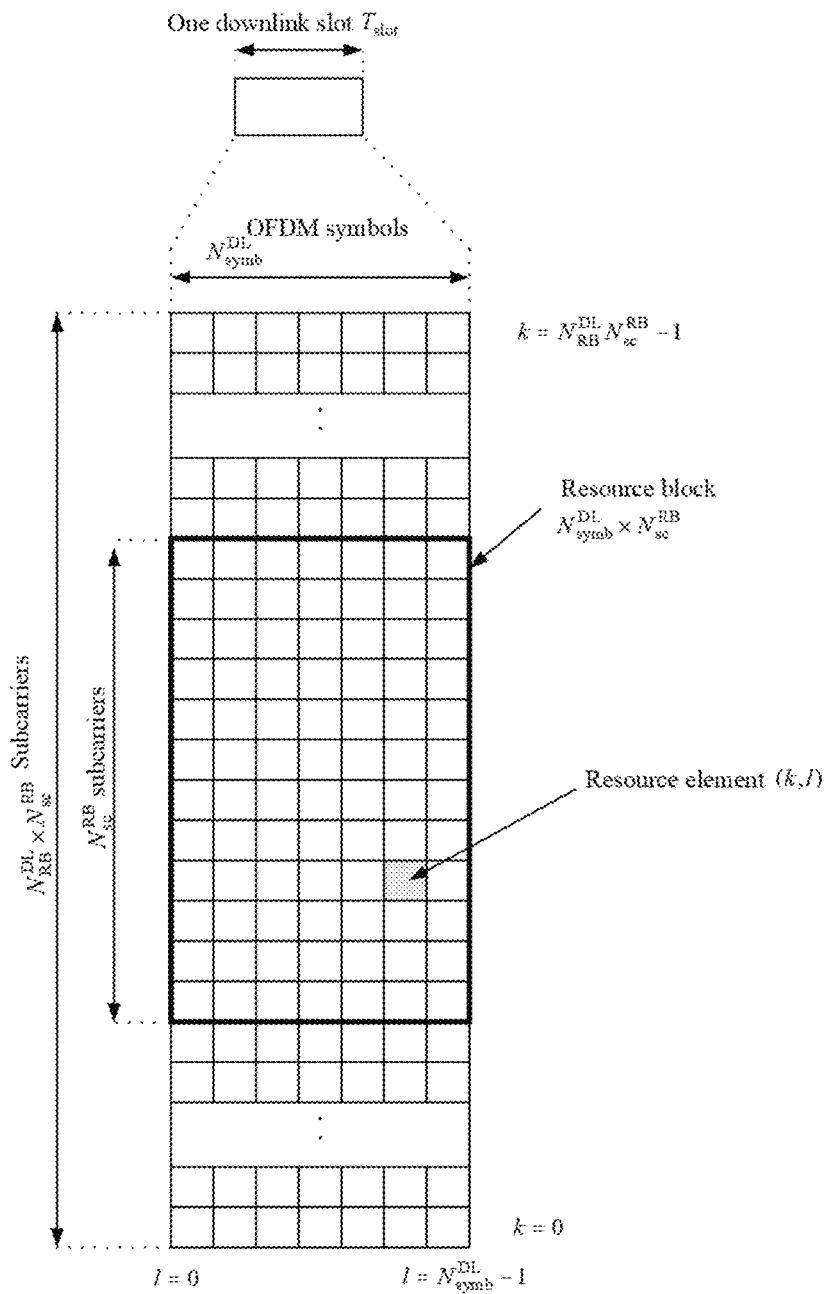
FIG. 3 is a schematic diagram of a downlink resource grid in the related art.
Figure 4:
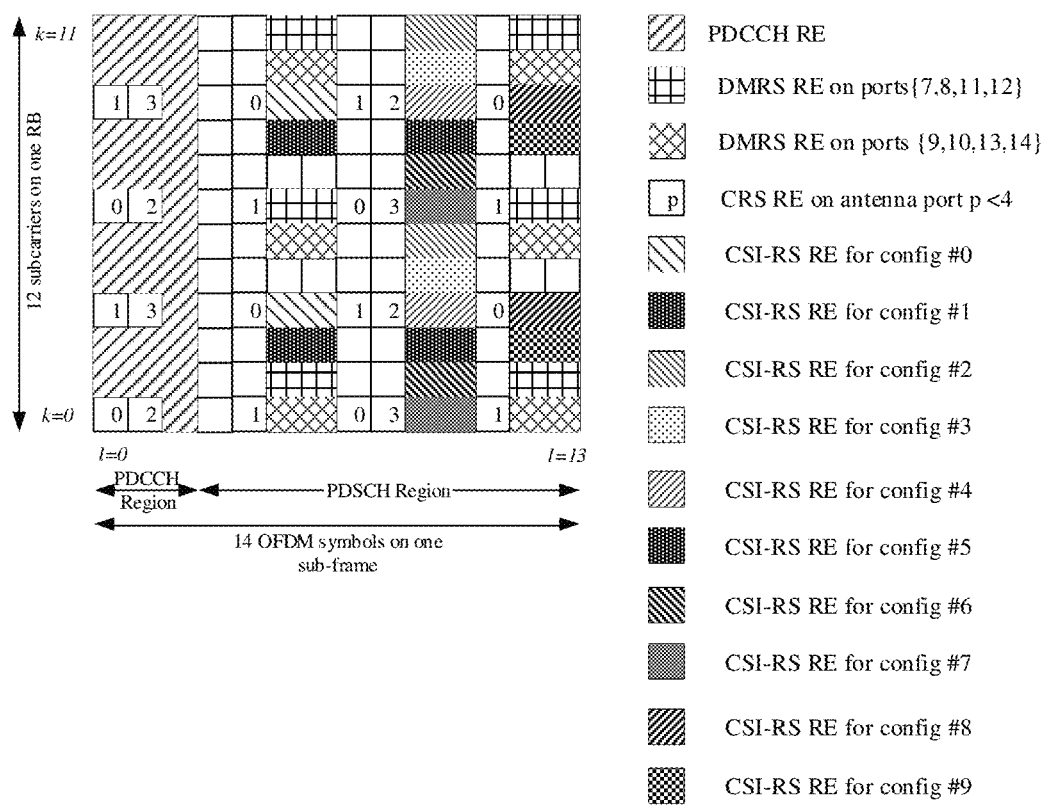
FIG. 4 is a schematic diagram of a resource pattern of a channel state information reference signal with the number of ports being 4 on a RB pair in the related art.
Figure 5:
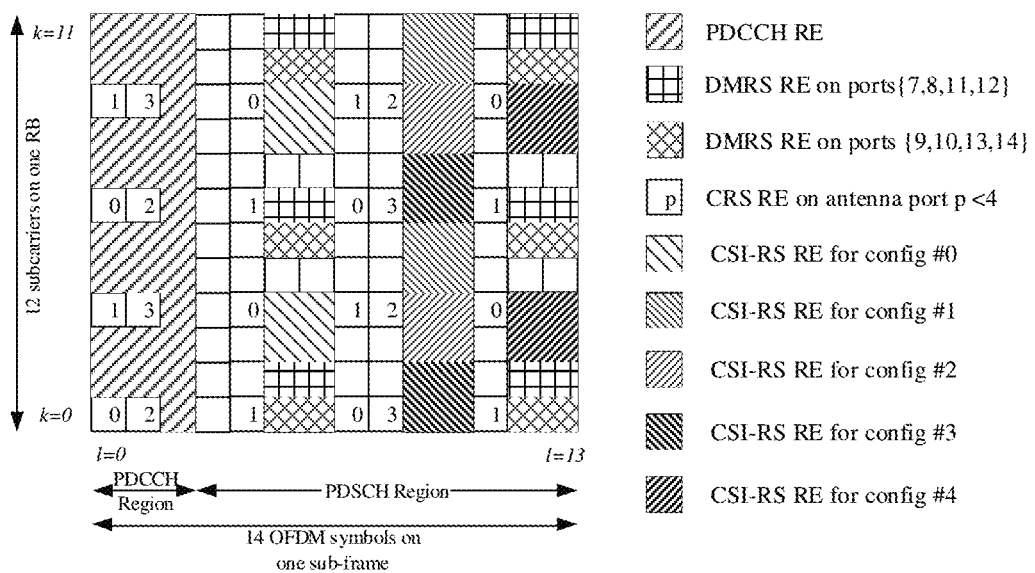
FIG. 5 is a schematic diagram of a resource pattern of a channel state information reference signal with the number of ports being 8 on a RB pair in the related art.
Figure 6:
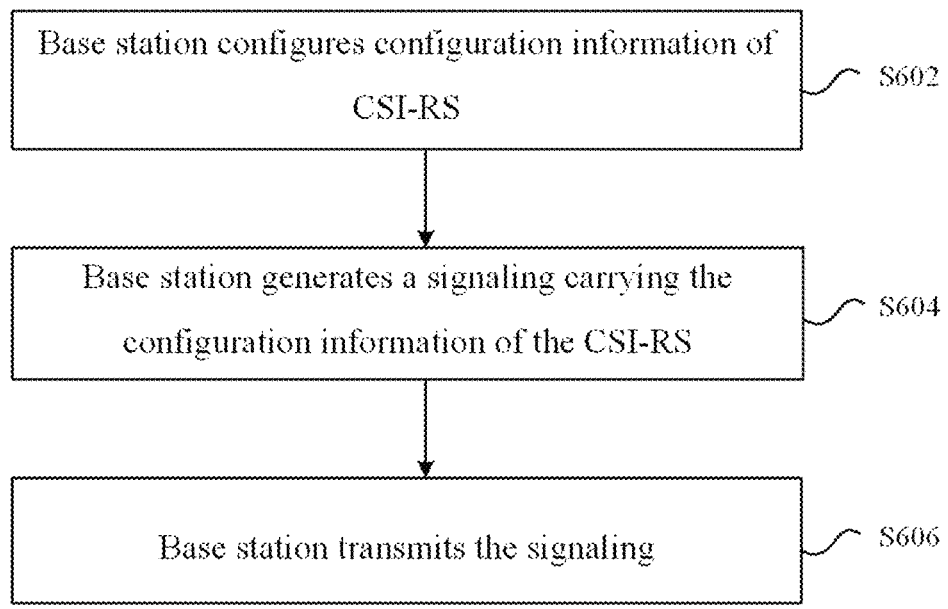
FIG. 6 is a flowchart of a method for configuring a channel state information reference signal according to an embodiment of the present disclosure.

An embodiment of the present disclosure provides a method for configuring a channel state information reference signal. FIG. 6 is a flowchart of the method for configuring a channel state information reference signal according to an embodiment of the present disclosure. As shown in FIG. 6, the flow includes the following steps.

In step S602, a base station configures configuration information of the CSI-RS.

In step S604, the base station generates a signaling carrying the configuration information of the CSI-RS.

In step S606, the base station transmits the signaling.

The configuration information comprises at least one of: a number of CSI-RS ports, a number K of components of a pilot resource pattern, a number N of ports of the components of the pilot resource pattern, and a CSI-RS port-numbering mode. The CSI-RS port-numbering mode has M types of candidate port-numbering mode, and M, K, and N are positive integers.

According to embodiments of the present disclosure, the configured configuration information of the CSI-RS is transmitted by the base station through the signaling. The configuration information includes at least one of: the number of pilot ports after aggregation, a number K of components of a pilot resource pattern, a number N of ports of the components of the pilot resource pattern, and a CSI-RS port-numbering mode. That is, by configuring the port pairing number composed of N and K and the CSI-RS port-numbering mode, the reference number of the port and the port position represented by the code-book element are consistent with the polarization property, thereby solving a problem in the related art that the serial numbers or the sequence of antenna ports are unable to reflect the positional relationship and polarization property relationship of antennas in actual topology relationships, thereby improving the feedback channel precision and making full use of the signal transmission power.

In an alternative example of this embodiment, a number pair composed of the value of N and the value of K is represented as (N, K). The (N, K) has Q candidate values, and the Q candidate values are divided into X sets. The type of the CSI-RS port-numbering mode is selected based on one of the X sets to which the (N, K) belongs. The (N, K) denotes the number pair composed of the value of N and the value of K, and Q and X are integers greater than 1. It should be noted that if two elements of one number pair are correspondingly the same as two elements of another number pair, the two number pairs have a same value. For example, (8, 2) and (8, 2) have a same value. However, (8, 2) and (2, 8) are two different number pairs, that is, (8, 2) and (2, 8) have two different values.

In addition, for the above-involved sets into which Q candidate values are divided, in an alternative example of this embodiment, the sets include: a first set using a first type of CSI-RI port-numbering mode, a second set using a second type of CSI-RS port-numbering mode, and a third set using the first type of CSI-RS port-numbering mode or the second type of CSI-RS port-numbering mode. The first type of CSI-RS port-numbering mode is different from the second type of CSI-RS port-numbering mode.

In an alternative example of this embodiment, the configuration information involved in this embodiment further includes a code division multiplexing mode between ports. Types of the code division multiplexing mode include: a first type of code division multiplexing mode and a second type of code division multiplexing mode. The first type of code division multiplexing mode uses a first type of CSI-RS port-numbering mode, and the second type of code division multiplexing mode uses a second type of CSI-RS port-numbering mode. The first type of code division multiplexing mode is different from the second type of code division multiplexing mode, and the first type of CSI-RS port-numbering mode is different from the second type of CSI-RS port-numbering mode.

For the above-mentioned types of the code division multiplexing mode, the following description is provided by way of example. In the alternative implementation of this embodiment, the following types may be included.

In a first type, the first type of code division multiplexing mode is a code division multiplexing mode with a multiplexing length of 2, and the second type of code division multiplexing mode is a code division multiplexing mode with a multiplexing length of 4.

In a second type, the first type of code division multiplexing mode is a code division multiplexing mode in time domain, and the second type of code division multiplexing mode is a code division multiplexing mode in both of time domain and frequency domain.

In a third type, the first type of code division multiplexing mode is a code division multiplexing mode on consecutive subcarriers, and the second type of code division multiplexing mode is a code division multiplexing mode on separated subcarriers.

It should be noted that, the types of the code division multiplexing mode described above are merely illustrative examples, and do not constitute limitations on the present disclosure. Other types of code division multiplexing modes are also within the protection scope of the present disclosure and can be configured correspondingly according to actual conditions.

In another alternative example of this embodiment, the configuration information involved in this embodiment further includes a grouping mode of code division multiplexed ports. The grouping mode of code division multiplexed ports includes U candidate modes, and the U candidate modes are divided into Y sets. The type of the CSI-RS port-numbering mode is selected based one of the Y sets to which the grouping mode of code division multiplexed ports belongs, and U and Y are integers greater than 1. The Y sets includes a first set using a first type of CSI-RS port-numbering mode, a second set using a second type of CSI-RS port-numbering mode, and a third set using the first type of CSI-RS port-numbering mode or the second type of CSI-RS port-numbering mode. The first type of CSI-RS port-numbering mode is different from the second type of CSI-RS port-numbering mode.

In addition, for the candidate port-numbering modes involved in this embodiment, the candidate port-numbering modes may involve multiple types. The candidate port-numbering modes are described below through examples.

(1): the candidate port-numbering mode may be: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter. This candidate port-numbering mode may be determined through a mapping relationship of a following function:

$$p_{T_{port}} = k * \left(\frac{N}{2}\right) + p_{N_{port\_k}} + \frac{N*(K-1)}{2} * u\left(p_{N_{port\_k}} - \frac{N}{2}\right),$$

$$u(n) = \begin{cases} 1, n \geq 0 \\ 0, n < 0 \end{cases}$$

$p_{T_{port}}$ denotes a port number of a CSI-RS having T ports, k denotes a sequence number of a component, $p_{N_{port\_k}}$ denotes a port number in a CSI-RS of a kth component, the number of ports in the CSI-RS of the kth component is N, the value of k ranges from 0 to N−1, and N is an integer greater than 1.

(2), the candidate port-numbering mode may be: ports of each of the components are successively arranged in the aggregated CSI-RS. This candidate port-numbering mode may be determined through a mapping relationship of a following function:

$$p_{Tport}=k*N+p_{Nport\_k}$$

$p_{Tport}$ denotes a port number of a CSI-RS having T ports, k denotes a sequence number of a component, $p_{Nport\_k}$ denotes a port number in a CSI-RS of the kth component, the number of ports in the CSI-RS of the kth component is N, the value of k ranges from 0 to N−1, and N is an integer greater than 1.

(3): the candidate port-numbering mode may be: exchanging positions of a 17th port and a 19th port for each of the components, exchanging positions of a 18th port and a 20th port for each of the components, and arranging the components according to sequence numbers thereof in an ascending order. This candidate port-numbering mode may be determined through a mapping relationship of a following function:

$$p_{Tport} = k*N + p_{N_{port\_k}} + 2*\delta(p_{N_{port\_k}} - 17) +$$
$$2*\delta(p_{N_{port\_k}} - 18) - 2*\delta(p_{N_{port\_k}} - 19) - 2*\delta(p_{N_{port\_k}} - 20)$$
$$\delta(n) = \begin{cases} 1, & n = 0 \\ 0, & n \neq 0 \end{cases}$$

$p_{Tport}$ denotes a port number of a CSI-RS having T ports, k denotes a sequence number of a component, $p_{Nport\_k}$ denotes a port number in a CSI-RS of the kth component, the number of ports in the CSI-RS of the kth component is N, the value of k ranges from 0 to N−1, and N is an integer greater than 1.

In another alternative example of this embodiment, a port-numbering mode indicated by a value of (N, K) being (8, 2) is as follow: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter, where (N, K) denotes a number pair composed of values of N and K. This candidate port-numbering mode may be determined through a mapping relationship of a following function:

$$p_{Tport} = k*\left(\frac{N}{2}\right) + p_{N_{port\_k}} + \frac{N*(K-1)}{2}*u\left(p_{N_{port\_k}} - \frac{N}{2}\right),$$
$$u(n) = \begin{cases} 1, n \geq 0 \\ 0, n < 0 \end{cases}$$

$p_{Tport}$ denotes a port number of a CSI-RS having T ports, k denotes a sequence number of a component, $p_{Nport\_k}$ denotes a port number in a CSI-RS of the kth component, the number of ports in the CSI-RS of the kth component is N, the value of k ranges from 0 to N−1, and N is an integer greater than 1.

It can be learned from the above alternative example, the port-numbering mode indicated by (N, K) the value of which is (8, 2) is the candidate port-numbering mode (1) in the first case in the above embodiments. That is, the N and K in the mentioned in the candidate port-numbering mode (1) in the first case in the above embodiments may have multiple values. However, when the value of (N, K) is (8, 2), the candidate port-numbering mode can only be the candidate port-numbering mode (1) in the first case.

The case of the candidate port-numbering mode (2) in the second case is similar. The N and K in the mentioned in the candidate port-numbering mode (2) in the second case may have multiple values. However, when the value of (N, K) is that the value of (N, K) is (2, 8) or (2, 6), the indicated candidate port-numbering mode can only be the candidate port-numbering mode (2) in the second case. That is, when the value of (N, K) is (2, 8) or (2, 6), the port-numbering mode is: ports of each of the components are successively arranged in an aggregated CSI-RS, where (N, K) denotes a number pair composed of values of N and K. This candidate port-numbering mode may be determined through a mapping relationship of a following function:

$$p_{Tport}=k*N+p_{Nport\_k}$$

$p_{Tport}$ denotes a port number of a CSI-RS having T ports, k denotes a sequence number of a component, $p_{Nport\_k}$ denotes a port number in a CSI-RS of the kth component, the number of ports in the CSI-RS of the kth component is N, the value of k ranges from 0 to N−1, and N is an integer greater than 1.

The case of the candidate port-numbering mode (3) in the third case is similar. The N and K in the mentioned in the candidate port-numbering mode (3) in the third case may have multiple values. The configuration information further includes an inter-port code division multiplexing length. However, the port-numbering mode indicated by the inter-port code division multiplexing length of 4 can only be the candidate port-numbering mode (3) in the third case. That is, the port-numbering mode having an inter-port code division multiplexing length of 4 is: exchanging positions of a 17th port and a 19th port for each of the components, exchanging a position of a 18th port and a 20th port for each of the components, and arranging the components according to sequence numbers thereof in an ascending order. This candidate port-numbering mode may be determined through a mapping relationship of a following function:

$$p_{Tport} = k*N + p_{N_{port\_k}} + 2*\delta(p_{N_{port\_k}} - 17) +$$
$$2*\delta(p_{N_{port\_k}} - 18) - 2*\delta(p_{N_{port\_k}} - 19) - 2*\delta(p_{N_{port\_k}} - 20)$$
$$\delta(n) = \begin{cases} 1, & n = 0 \\ 0, & n \neq 0 \end{cases}$$

$p_{Tport}$ denotes a port number of a CSI-RS having T ports, k denotes a sequence number of a component, $p_{Nport\_k}$ denotes a port number in a CSI-RS of the kth component, the number of ports in the CSI-RS of the kth component is N, the value of k ranges from 0 to N−1, and N is an integer greater than 1.

In another alternative example of this embodiment, the configuration involved in this embodiment may further include a grouping mode of code division multiplexed ports. The M types of CSI-RS port-numbering mode are divided into E sets, and a type of the grouping mode of code division multiplexed ports is selected based on one of the E sets to which a selected CSI-RS-port-numbering mode belongs, where E is an integer greater than 1. The number of the E sets of the M types of CSI-RS port-numbering mode is 3, and the 3 sets include: a first set using a first type of grouping mode of code division multiplexed ports, a second set using a second type of grouping mode of code division multiplexed ports, and a third set using the first type of grouping mode of code division multiplexed ports or the second type of grouping mode of code division multiplexed ports. The first type of grouping mode of code division multiplexed ports is different from the second type of grouping mode of code division multiplexed ports.

In another alternative example of this embodiment, the configuration information involved in this embodiment may further include a grouping mode of code division multiplexed ports. A candidate type of the grouping mode of code division multiplexed ports includes: in a same group, differences between two maximum port numbers and two minimum port numbers are $$\frac{(k*N)}{2}.$$

Based on this candidate grouping mode of code division multiplexed ports, a port number in the same group of the candidate grouping mode of code division multiplexed ports in a specific example of this embodiment is:

$$\left\{(15, 16), (15, 16) + \frac{k*N}{2}\right\} + m*2, m = 0, 1, 2, 3,$$

where m is a sequence number for distinguishing different groups.

In another alternative example of this embodiment, the configuration information involved in this embodiment may further include a grouping mode of code division multiplexed ports. A candidate type of the grouping mode of code division multiplexed ports includes: in a same group, differences between two larger port numbers and two smaller port numbers are 4. In a specific example of this embodiment, the port number in the same group in the candidate grouping mode of code division multiplexed ports is {(15, 16), (15, 16)+4}+m+k*N, m=0, 2 where m is a sequence number for distinguishing different groups, k is a sequence number for distinguishing components of an aggregated CSI-RS, and a value of k is 0 or 1.

In another alternative example of this embodiment, the configuration information further includes a grouping mode of code division multiplexed ports, and a candidate type of the grouping mode of code division multiplexed ports includes: port numbers in a same group are consecutive. In a specific example of this embodiment, the port number in the same group in the candidate grouping mode of code division multiplexed ports is {15, 16, 17, 18}+4*m, m=0, 1, 2, 3, where m is a sequence number for distinguishing different groups.

Figure 7:
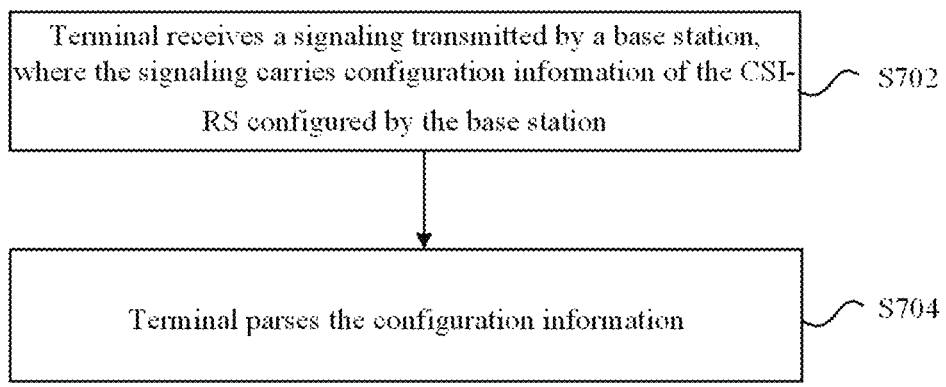
FIG. 7 is a flowchart of a method for parsing a channel state information reference signal according to an embodiment of the present disclosure.

FIG. 7 is a flowchart of a method for parsing a channel state information reference signal according to an embodiment of the present disclosure. As shown in FIG. 7, the method includes the following steps.

In step S702, a terminal receives a signaling transmitted by a base station, and the signaling carries configuration information of the CSI-RS configured by the base station.

In step S704, the terminal parses the configuration information.

The configuration information includes at least one of: a number of CSI-RS ports, a number K of components of a pilot resource pattern, a number N of ports of the components of the pilot resource pattern, and a CSI-RS port-numbering mode. The CSI-RS port-numbering mode includes M types of candidate port-numbering mode, and M, K, and N are positive integers.

In an alternative example of this embodiment, a number pair composed of the value of N and the value of K is represented as (N, K). The (N, K) has Q candidate values, and the Q candidate values are divided into X sets. The type of the CSI-RS port-numbering mode is selected based on one of the X sets to which the (N, K) belongs. The (N, K) denotes the number pair composed of the value of N and the value of K, and Q and X are integers greater than 1. It should be noted that if two elements of one number pair are correspondingly the same as two elements of another number pair, the two number pairs have a same value. For example, (8, 2) and (8, 2) have a same value. However, (8, 2) and (2, 8) are two different number pairs, that is, (8, 2) and (2, 8) have two different values.

In addition, for the above-involved sets into which Q candidate values are divided, in an alternative example of this embodiment, the sets include: a first set using a first type of CSI-RI port-numbering mode, a second set using a second type of CSI-RS port-numbering mode, and a third set using the first type of CSI-RS port-numbering mode or the second type of CSI-RS port-numbering mode. The first type of CSI-RS port-numbering mode is different from the second type of CSI-RS port-numbering mode.

In an alternative example of this embodiment, the configuration information involved in this embodiment further includes a code division multiplexing mode between ports. Types of the code division multiplexing mode include: a first type of code division multiplexing mode and a second type of code division multiplexing mode. The first type of code division multiplexing mode uses a first type of CSI-RS port-numbering mode, and the second type of code division multiplexing mode uses a second type of CSI-RS port-numbering mode. The first type of code division multiplexing mode is different from the second type of code division multiplexing mode, and the first type of CSI-RS port-numbering mode is different from the second type of CSI-RS port-numbering mode.

For the above-mentioned types of the code division multiplexing mode, the following description is provided by way of example. In the alternative implementation of this embodiment, the following types may be included.

In a first type, the first type of code division multiplexing mode is a code division multiplexing mode with a multiplexing length of 2, and the second type of code division multiplexing mode is a code division multiplexing mode with a multiplexing length of 4.

In a second type, the first type of code division multiplexing mode is a code division multiplexing mode in time domain, and the second type of code division multiplexing mode is a code division multiplexing mode in both of time domain and frequency domain.

In a third type, the first type of code division multiplexing mode is a code division multiplexing mode on consecutive subcarriers, and the second type of code division multiplexing mode is a code division multiplexing mode on separated subcarriers.

It should be noted that, the types of the code division multiplexing mode described above are merely illustrative examples, and do not constitute limitations on the present disclosure. Other types of code division multiplexing modes are also within the protection scope of the present disclosure and can be configured correspondingly according to actual conditions.

In another alternative example of this embodiment, the configuration information involved in this embodiment further includes a grouping mode of code division multiplexed ports. The grouping mode of code division multiplexed ports includes U candidate modes, and the U candidate modes are divided into Y sets. The type of the CSI-RS port-numbering mode is selected based one of the Y sets to which the grouping mode of code division multiplexed ports belongs, and U and Y are integers greater than 1. The Y sets includes a first set using a first type of CSI-RS port-numbering mode, a second set using a second type of CSI-RS port-numbering mode, and a third set using the first type of CSI-RS port-numbering mode or the second type of CSI-RS port-numbering mode. The first type of CSI-RS port-numbering mode is different from the second type of CSI-RS port-numbering mode.

In addition, for the candidate port-numbering modes involved in this embodiment, the candidate port-numbering modes may involve multiple types. The candidate port-numbering modes are described below through examples.

(1): the candidate port-numbering mode may be: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter. This candidate port-numbering mode may be determined through a mapping relationship of a following function:

$$p_{T_{port}} = k * \left(\frac{N}{2}\right) + p_{N_{port\_k}} + \frac{N*(K-1)}{2} * u\left(p_{N_{port\_k}} - \frac{N}{2}\right),$$

$$u(n) = \begin{cases} 1, n \geq 0 \\ 0, n < 0 \end{cases}$$

$p_{T_{port}}$ denotes a port number of a CSI-RS having T ports, k denotes a sequence number of a component, $p_{N_{port\_k}}$ denotes a port number in a CSI-RS of a kth component, the number of ports in the CSI-RS of the kth component is N, the value of k ranges from 0 to N−1, and N is an integer greater than 1.

(2), the candidate port-numbering mode may be: ports of each of the components are successively arranged in the aggregated CSI-RS. This candidate port-numbering mode may be determined through a mapping relationship of a following function:

$$p_{T_{port}} = k*N + p_{N_{port\_k}}$$

$p_{T_{port}}$ denotes a port number of a CSI-RS having T ports, k denotes a sequence number of a component, $p_{N_{port\_k}}$ denotes a port number in a CSI-RS of the kth component, the number of ports in the CSI-RS of the kth component is N, the value of k ranges from 0 to N−1, and N is an integer greater than 1.

(3): the candidate port-numbering mode may be: exchanging positions of a 17th port and a 19th port for each of the components, exchanging positions of a 18th port and a 20th port for each of the components, and arranging the components according to sequence numbers thereof in an ascending order. This candidate port-numbering mode may be determined through a mapping relationship of a following function:

$$p_{T_{port}} = k*N + p_{N_{port\_k}} + 2*\delta(p_{N_{port\_k}} - 17) +$$
$$2*\delta(p_{N_{port\_k}} - 18) - 2*\delta(p_{N_{port\_k}} - 19) - 2*\delta(p_{N_{port\_k}} - 20)$$

$$\delta(n) = \begin{cases} 1, n = 0 \\ 0, n \neq 0 \end{cases}$$

$p_{T_{port}}$ denotes a port number of a CSI-RS having T ports, k denotes a sequence number of a component, $p_{N_{port\_k}}$ denotes a port number in a CSI-RS of the kth component, the number of ports in the CSI-RS of the kth component is N, the value of k ranges from 0 to N−1, and N is an integer greater than 1.

In another alternative example of this embodiment, a port-numbering mode indicated by a value of (N, K) being (8, 2) is as follow: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter, where (N, K) denotes a number pair composed of values of N and K. This candidate port-numbering mode may be determined through a mapping relationship of a following function:

$$p_{T_{port}} = k * \left(\frac{N}{2}\right) + p_{N_{port\_k}} + \frac{N*(K-1)}{2} * u\left(p_{N_{port\_k}} - \frac{N}{2}\right),$$

$$u(n) = \begin{cases} 1, n \geq 0 \\ 0, n < 0 \end{cases}$$

$p_{T_{port}}$ denotes a port number of a CSI-RS having T ports, k denotes a sequence number of a component, $p_{N_{port\_k}}$ denotes a port number in a CSI-RS of the kth component, the number of ports in the CSI-RS of the kth component is N, the value of k ranges from 0 to N−1, and N is an integer greater than 1.

It can be learned from the above alternative example, the port-numbering mode indicated by (N, K) the value of which is (8, 2) is the candidate port-numbering mode (1) in the first case in the above embodiments. That is, the N and K mentioned in the candidate port-numbering mode (1) in the first case in the above embodiments may have multiple values. However, when the value of (N, K) is (8, 2), the candidate port-numbering mode can only be the candidate port-numbering mode (1) in the first case.

The case of the candidate port-numbering mode (2) in the second case is similar. The N and K in the mentioned in the candidate port-numbering mode (2) in the second case may have multiple values. However, when the value of (N, K) is that the value of (N, K) is (2, 8) or (2, 6), the indicated candidate port-numbering mode can only be the candidate port-numbering mode (2) in the second case. That is, when the value of (N, K) is (2, 8) or (2, 6), the port-numbering mode is: ports of each of the components are successively arranged in an aggregated CSI-RS, where (N, K) denotes a number pair composed of values of N and K. This candidate port-numbering mode may be determined through a mapping relationship of a following function:

$$p_{T_{port}} = k*N + p_{N_{port\_k}}$$

$p_{T_{port}}$ denotes a port number of a CSI-RS having T ports, k denotes a sequence number of a component, $p_{N_{port\_k}}$ denotes a port number in a CSI-RS of the kth component, the number of ports in the CSI-RS of the kth component is N, the value of k ranges from 0 to N−1, and N is an integer greater than 1.

The case of the candidate port-numbering mode (3) in the third case is similar. The N and K in the mentioned in the candidate port-numbering mode (3) in the third case may have multiple values. The configuration information further includes an inter-port code division multiplexing length. However, the port-numbering mode indicated by the inter-port code division multiplexing length of 4 can only be the candidate port-numbering mode (3) in the third case. That is, the port-numbering mode having an inter-port code division multiplexing length of 4 is: exchanging positions of a 17th port and a 19th port for each of the components, exchanging a position of a 18th port and a 20th port for each of the components, and arranging the components according to sequence numbers thereof in an ascending order. This candidate port-numbering mode may be determined through a mapping relationship of a following function:

$$p_{T_{port}} = k*N + p_{N_{port\_k}} + 2*\delta(p_{N_{port\_k}} - 17) + 2*\delta(p_{N_{port\_k}} - 18) - 2*\delta(p_{N_{port\_k}} - 19) - 2*\delta(p_{N_{port\_k}} - 20)$$

$$\delta(n) = \begin{cases} 1, & n = 0 \\ 0, & n \neq 0 \end{cases}$$

$p_{T_{port}}$ denotes a port number of a CSI-RS having T ports, k denotes a sequence number of a component, $p_{N_{port\_k}}$ denotes a port number in a CSI-RS of the kth component, the number of ports in the CSI-RS of the kth component is N, the value of k ranges from 0 to N−1, and N is an integer greater than 1.

In another alternative example of this embodiment, the configuration involved in this embodiment may further include a grouping mode of code division multiplexed ports. The M types of CSI-RS port-numbering mode are divided into E sets, and a type of the grouping mode of code division multiplexed ports is selected based on one of the E sets to which a selected CSI-RS-port-numbering mode belongs, where E is an integer greater than 1. The number of the E sets of the M types of CSI-RS port-numbering mode is 3, and the 3 sets include: a first set using a first type of grouping mode of code division multiplexed ports, a second set using a second type of grouping mode of code division multiplexed ports, and a third set using the first type of grouping mode of code division multiplexed ports or the second type of grouping mode of code division multiplexed ports. The first type of grouping mode of code division multiplexed ports is different from the second type of grouping mode of code division multiplexed ports.

In another alternative example of this embodiment, the configuration information involved in this embodiment may further include a grouping mode of code division multiplexed ports. A candidate type of the grouping mode of code division multiplexed ports includes: in a same group, differences between two port numbers which have maximum sequence numbers and two port numbers which have minimum sequence numbers are $$\frac{(k*N)}{2}.$$

Based on this candidate grouping mode of code division multiplexed ports, the port number in the same group of the candidate grouping mode of code division multiplexed ports in a specific example of this embodiment, in a same group, one port number is:

$$\left\{(15, 16), (15, 16) + \frac{k*N}{2}\right\} + m*2, m = 0, 1, 2, 3,$$

where m is a sequence number for distinguishing different groups.

In another alternative example of this embodiment, the configuration information involved in this embodiment may further include a grouping mode of code division multiplexed ports. A candidate type of the grouping mode of code division multiplexed ports includes: in a same group, differences between two port numbers which have larger sequence numbers and two port numbers which have smaller sequence numbers are 4. In a specific example of this embodiment, the port number in the same group in the candidate grouping mode of code division multiplexed ports is $\{(15, 16), (15, 16)+4\}+m+k*N$, m=0, 2 where m is a sequence number for distinguishing different groups, k is a sequence number for distinguishing components of an aggregated CSI-RS, and a value of k is 0 or 1.

In another alternative example of this embodiment, the configuration information further includes a grouping mode of code division multiplexed ports, and a candidate type of the grouping mode of code division multiplexed ports includes: sequence numbers of ports in a same group are consecutive. In a specific example of this embodiment, the port number in the same group in the candidate grouping mode of code division multiplexed ports is $\{15, 16, 17, 18\}+4*m$, m=0, 1, 2, 3, where m is a sequence number for distinguishing different groups.

Through the description of the above examples, those skilled in the art can clearly understand that the method according to the above embodiments can be implemented by means of software plus a necessary general hardware platform. Of course, the above embodiments can be implemented by hardware. However, in many cases, the former is better. Based on such understanding, the technical solution of the present disclosure, in essence, can be embodied in the form of a software product, or the part of the technical solution that contributes to the existing art can be embodied in the form of a software product. The computer software product is stored in a storage medium (such as ROM/RAM, magnetic disk, optical disk) including instructions for enabling a terminal device (which may be a mobile phone, a computer, a server, or a network device, etc.) to perform the methods described in the various embodiments of the present disclosure.

Embodiments of the present disclosure further provide a device for a channel state information reference signal (CSI-RS). The device is used for implementing the above embodiments and preferred examples, contents which has been described will not be repeated below. The term "module" as used below may a combination of software and/or hardware capable of implementing a predetermined function. Although the device described in the following embodiments is preferably implemented in software, implementation of hardware or a combination of software and hardware is also possible and conceived.

Figure 8:
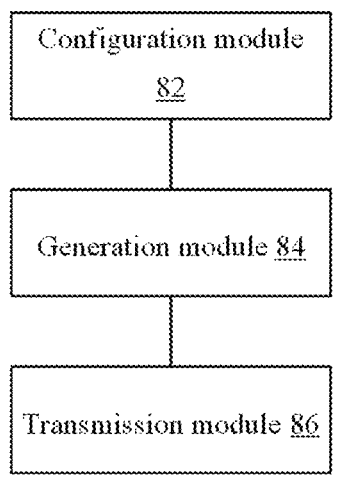
FIG. 8 is a structural block diagram of a device for configuring a channel state information reference signal according to an embodiment of the present disclosure.

FIG. 8 is a structural block diagram of a device for configuring a channel state information reference signal according to an embodiment of the present disclosure. As shown in FIG. 8, the device is applied at a base station side and includes a configuration module 82 configured to configure configuration information of the CSI-RS; a generation module 84 coupled to the configuration module 82 and configured to generate a signaling carrying the configuration information of the CSI-RS; and a transmission module 86 coupled with the generation module 84 and configured to transmit the signaling. The configuration information includes at least one of: a number of CSI-RS ports, a number K of components of a pilot resource pattern, a number N of ports of the components of the pilot resource pattern, and a CSI-RS port-numbering mode. The CSI-RS port-numbering mode includes M types of candidate port-numbering mode, and M, K, and N are positive integers.

In an alternative example of this embodiment, a number pair composed of the value of N and the value of K is represented as (N, K). The (N, K) has Q candidate values, and the Q candidate values are divided into X sets. The type of the CSI-RS port-numbering mode is selected based on one of the X sets to which the (N, K) belongs. The (N, K) denotes the number pair composed of the value of N and the value of K, and Q and X are integers greater than 1. It should be noted that if two elements of one number pair are correspondingly the same as two elements of another number pair, the two number pairs have a same value. For example, (8, 2) and (8, 2) have a same value. However, (8, 2) and (2, 8) are two different number pairs, that is, (8, 2) and (2, 8) have two different values.

In addition, for the above-involved sets into which Q candidate values are divided, in an alternative example of this embodiment, the sets include: a first set using a first type of CSI-RI port-numbering mode, a second set using a second type of CSI-RS port-numbering mode, and a third set using the first type of CSI-RS port-numbering mode or the second type of CSI-RS port-numbering mode. The first type of CSI-RS port-numbering mode is different from the second type of CSI-RS port-numbering mode.

In an alternative example of this embodiment, the configuration information involved in this embodiment further includes a code division multiplexing mode between ports. Types of the code division multiplexing mode include: a first type of code division multiplexing mode and a second type of code division multiplexing mode. The first type of code division multiplexing mode uses a first type of CSI-RS port-numbering mode, and the second type of code division multiplexing mode uses a second type of CSI-RS port-numbering mode. The first type of code division multiplexing mode is different from the second type of code division multiplexing mode, and the first type of CSI-RS port-numbering mode is different from the second type of CSI-RS port-numbering mode.

For the above-mentioned types of the code division multiplexing mode, the following description is provided by way of example. In the alternative implementation of this embodiment, the following types may be included.

In a first type, the first type of code division multiplexing mode is a code division multiplexing mode with a multiplexing length of 2, and the second type of code division multiplexing mode is a code division multiplexing mode with a multiplexing length of 4.

In a second type, the first type of code division multiplexing mode is a code division multiplexing mode in time domain, and the second type of code division multiplexing mode is a code division multiplexing mode in both of time domain and frequency domain.

In a third type, the first type of code division multiplexing mode is a code division multiplexing mode on consecutive subcarriers, and the second type of code division multiplexing mode is a code division multiplexing mode on separated subcarriers.

It should be noted that, the types of the code division multiplexing mode described above are merely illustrative examples, and do not constitute limitations on the present disclosure. Other types of code division multiplexing modes are also within the protection scope of the present disclosure and can be configured correspondingly according to actual conditions.

In another alternative example of this embodiment, the configuration information involved in this embodiment further includes a grouping mode of code division multiplexed ports. The grouping mode of code division multiplexed ports includes U candidate modes, and the U candidate modes are divided into Y sets. The type of the CSI-RS port-numbering mode is selected based one of the Y sets to which the grouping mode of code division multiplexed ports belongs, and U and Y are integers greater than 1. The Y sets includes a first set using a first type of CSI-RS port-numbering mode, a second set using a second type of CSI-RS port-numbering mode, and a third set using the first type of CSI-RS port-numbering mode or the second type of CSI-RS port-numbering mode. The first type of CSI-RS port-numbering mode is different from the second type of CSI-RS port-numbering mode.

In addition, for the candidate port-numbering modes involved in this embodiment, the candidate port-numbering modes may involve multiple types. The candidate port-numbering modes are described below through examples.

(1): the candidate port-numbering mode may be: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter. This candidate port-numbering mode may be determined through a mapping relationship of a following function:

$$p_{T_{port}} = k*\left(\frac{N}{2}\right) + p_{N_{port\_k}} + \frac{N*(K-1)}{2}*u\left(p_{N_{port\_k}} - \frac{N}{2}\right),$$

$$u(n) = \begin{cases} 1, n \geq 0 \\ 0, n < 0 \end{cases}$$

$p_{T_{port}}$ denotes a port number of a CSI-RS having T ports, k denotes a sequence number of a component, $p_{N_{port\_k}}$ denotes a port number in a CSI-RS of a kth component, the number of ports in the CSI-RS of the kth component is N, the value of k ranges from 0 to N−1, and N is an integer greater than 1.

(2), the candidate port-numbering mode may be: ports of each of the components are successively arranged in the aggregated CSI-RS. This candidate port-numbering mode may be determined through a mapping relationship of a following function:

$$p_{T_{port}} = k*N + p_{N_{port\_k}}$$

$p_{T_{port}}$ denotes a port number of a CSI-RS having T ports, k denotes a sequence number of a component, $p_{N_{port\_k}}$ denotes a port number in a CSI-RS of a kth component, the number of ports in the CSI-RS of the kth component is N, the value of k ranges from 0 to N−1, and N is an integer greater than 1.

(3): the candidate port-numbering mode may be: exchanging positions of a 17th port and a 19th port for each of the components, exchanging positions of a 18th port and a 20th port for each of the components, and arranging the components according to sequence numbers thereof in an ascending order. This candidate port-numbering mode may be determined through a mapping relationship of a following function:

$$p_{T_{port}} = k*N + p_{N_{port\_k}} + 2*\delta(p_{N_{port\_k}} - 17) +$$
$$2*\delta(p_{N_{port\_k}} - 18) - 2*\delta(p_{N_{port\_k}} - 19) - 2*\delta(p_{N_{port\_k}} - 20)$$
$$\delta(n) = \begin{cases} 1, & n = 0 \\ 0, & n \neq 0 \end{cases}$$

$p_{T_{port}}$ denotes a port number of a CSI-RS having T ports, k denotes a sequence number of a component, $p_{N_{port\_k}}$ denotes a port number in a CSI-RS of the kth component, the number of ports in the CSI-RS of the kth component is N, the value of k ranges from 0 to N−1, and N is an integer greater than 1.

In another alternative example of this embodiment, a port-numbering mode indicated by a value of (N, K) being (8, 2) is as follow: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter, where (N, K) denotes a number pair composed of values of N and K. This candidate port-numbering mode may be determined through a mapping relationship of a following function:

$$p_{T_{port}} = k*\left(\frac{N}{2}\right) + p_{N_{port\_k}} + \frac{N*(K-1)}{2} * u\left(p_{N_{port\_k}} - \frac{N}{2}\right),$$
$$u(n) = \begin{cases} 1, n \geq 0 \\ 0, n < 0 \end{cases}$$

$p_{T_{port}}$ denotes a port number of a CSI-RS having T ports, k denotes a sequence number of a component, $p_{N_{port\_k}}$ denotes a port number in a CSI-RS of the kth component, the number of ports in the CSI-RS of the kth component is N, the value of k ranges from 0 to N−1, and N is an integer greater than 1.

It can be learned from the above alternative example, the port-numbering mode indicated by (N, K) the value of which is (8, 2) is the candidate port-numbering mode (1) in the first case in the above embodiments. That is, the N and K in the mentioned in the candidate port-numbering mode (1) in the first case in the above embodiments may have multiple values. However, when the value of (N, K) is (8, 2), the candidate port-numbering mode can only be the candidate port-numbering mode (1) in the first case.

The case of the candidate port-numbering mode (2) in the second case is similar. The N and K in the mentioned in the candidate port-numbering mode (2) in the second case may have multiple values. However, when the value of (N, K) is that the value of (N, K) is (2, 8) or (2, 6), the indicated candidate port-numbering mode can only be the candidate port-numbering mode (2) in the second case. That is, when the value of (N, K) is (2, 8) or (2, 6), the port-numbering mode is: ports of each of the components are successively arranged in an aggregated CSI-RS, where (N, K) denotes a number pair composed of values of N and K. This candidate port-numbering mode may be determined through a mapping relationship of a following function:

$$p_{T_{port}} = k*N + p_{N_{port\_k}}$$

$p_{T_{port}}$ denotes a port number of a CSI-RS having T ports, k denotes a sequence number of a component, $p_{N_{port\_k}}$ denotes a port number in a CSI-RS of the kth component, the number of ports in the CSI-RS of the kth component is N, the value of k ranges from 0 to N−1, and N is an integer greater than 1.

The case of the candidate port-numbering mode (3) in the third case is similar. The N and K in the mentioned in the candidate port-numbering mode (3) in the third case may have multiple values. The configuration information further includes an inter-port code division multiplexing length. However, the port-numbering mode indicated by the inter-port code division multiplexing length of 4 can only be the candidate port-numbering mode (3) in the third case. That is, the port-numbering mode having an inter-port code division multiplexing length of 4 is: exchanging positions of a 17th port and a 19th port for each of the components, exchanging a position of a 18th port and a 20th port for each of the components, and arranging the components according to sequence numbers thereof in an ascending order. This candidate port-numbering mode may be determined through a mapping relationship of a following function:

$$p_{T_{port}} = k*N + p_{N_{port\_k}} + 2*\delta(p_{N_{port\_k}} - 17) +$$
$$2*\delta(p_{N_{port\_k}} - 18) - 2*\delta(p_{N_{port\_k}} - 19) - 2*\delta(p_{N_{port\_k}} - 20)$$
$$\delta(n) = \begin{cases} 1, & n = 0 \\ 0, & n \neq 0 \end{cases}$$

$p_{T_{port}}$ denotes a port number of a CSI-RS having T ports, k denotes a sequence number of a component, $p_{N_{port\_k}}$ denotes a port number in a CSI-RS of the kth component, the number of ports in the CSI-RS of the kth component is N, the value of k ranges from 0 to N−1, and N is an integer greater than 1.

In another alternative example of this embodiment, the configuration involved in this embodiment may further include a grouping mode of code division multiplexed ports. The M types of CSI-RS port-numbering mode are divided into E sets, and a type of the grouping mode of code division multiplexed ports is selected based on one of the E sets to which a selected CSI-RS-port-numbering mode belongs, where E is an integer greater than 1. The number of the E sets of the M types of CSI-RS port-numbering mode is 3, and the 3 sets include: a first set using a first type of grouping mode of code division multiplexed ports, a second set using a second type of grouping mode of code division multiplexed ports, and a third set using the first type of grouping mode of code division multiplexed ports or the second type of grouping mode of code division multiplexed ports. The first type of grouping mode of code division multiplexed ports is different from the second type of grouping mode of code division multiplexed ports.

In another alternative example of this embodiment, the configuration information involved in this embodiment may further include a grouping mode of code division multiplexed ports. A candidate type of the grouping mode of code division multiplexed ports includes: in a same group, differences between two maximum port numbers and two minimum port numbers are $$\frac{(k*N)}{2}.$$

Based on this candidate grouping mode of code division multiplexed ports, the port number in the same group of the candidate grouping mode of code division multiplexed ports in a specific example of this embodiment is:

$$\left\{(15, 16), (15, 16) + \frac{k*N}{2}\right\} + m*2, m = 0, 1, 2, 3,$$

where m is a sequence number for distinguishing different groups.

In another alternative example of this embodiment, the configuration information involved in this embodiment may further include a grouping mode of code division multiplexed ports. A candidate type of the grouping mode of code division multiplexed ports includes: in a same group, differences between two port numbers which have larger sequence numbers and two port numbers which have smaller sequence numbers are 4. In a specific example of this embodiment, the port number in the same group in the candidate grouping mode of code division multiplexed ports is:

{(15, 16), (15, 16)+4}+m+k*N, m=0, 2 where m is a sequence number for distinguishing different groups, k is a sequence number for distinguishing components of an aggregated CSI-RS, and a value of k is 0 or 1.

In another alternative example of this embodiment, the configuration information further includes a grouping mode of code division multiplexed ports, and a candidate type of the grouping mode of code division multiplexed ports includes: sequence numbers of ports in a same group are consecutive. In a specific example of this embodiment, the port number in the same group in the candidate grouping mode of code division multiplexed ports is {15, 16, 17, 18}+4*m, m=0, 1, 2, 3, where m is a sequence number for distinguishing different groups.

Figure 9:
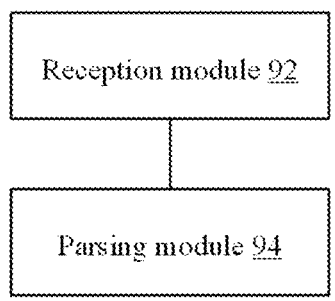
FIG. 9 is a structural block diagram of a device for parsing a channel state information reference signal according to an embodiment of the present disclosure.

FIG. 9 is a structural block diagram of a device for parsing a channel state information reference signal according to an embodiment of the present disclosure. The device is applied to a terminal side. As shown in FIG. 9, the device includes: a reception module 92 configured to receive a signaling that is transmitted by a base station, where the signaling carries configuration information of the CSI-RS that is configured by the base station; and a parsing module 94 coupled to the reception module 92 and configured to parse the configuration information. The configuration information comprises at least one of: a number of CSI-RS ports, a number K of components of a pilot resource pattern, a number N of ports of the components of the pilot resource pattern, and a CSI-RS port-numbering mode. The CSI-RS port-numbering mode comprises M types of candidate port-numbering mode, and M, K, and N are positive integers.

In an alternative example of this embodiment, a number pair composed of the value of N and the value of K is represented as (N, K). The (N, K) has Q candidate values, and the Q candidate values are divided into X sets. The type of the CSI-RS port-numbering mode is selected based on one of the X sets to which the (N, K) belongs. The (N, K) denotes the number pair composed of the value of N and the value of K, and Q and X are integers greater than 1. It should be noted that if two elements of one number pair are correspondingly the same as two elements of another number pair, the two number pairs have a same value. For example, (8, 2) and (8, 2) have a same value. However, (8, 2) and (2, 8) are two different number pairs, that is, (8, 2) and (2, 8) have two different values.

In addition, for the above-involved sets into which Q candidate values are divided, in an alternative example of this embodiment, the sets include: a first set using a first type of CSI-RI port-numbering mode, a second set using a second type of CSI-RS port-numbering mode, and a third set using the first type of CSI-RS port-numbering mode or the second type of CSI-RS port-numbering mode. The first type of CSI-RS port-numbering mode is different from the second type of CSI-RS port-numbering mode.

In an alternative example of this embodiment, the configuration information involved in this embodiment further includes a code division multiplexing mode between ports. Types of the code division multiplexing mode include: a first type of code division multiplexing mode and a second type of code division multiplexing mode. The first type of code division multiplexing mode uses a first type of CSI-RS port-numbering mode, and the second type of code division multiplexing mode uses a second type of CSI-RS port-numbering mode. The first type of code division multiplexing mode is different from the second type of code division multiplexing mode, and the first type of CSI-RS port-numbering mode is different from the second type of CSI-RS port-numbering mode.

For the above-mentioned types of the code division multiplexing mode, the following description is provided by way of example. In the alternative implementation of this embodiment, the following types may be included.

In a first type, the first type of code division multiplexing mode is a code division multiplexing mode with a multiplexing length of 2, and the second type of code division multiplexing mode is a code division multiplexing mode with a multiplexing length of 4.

In a second type, the first type of code division multiplexing mode is a code division multiplexing mode in time domain, and the second type of code division multiplexing mode is a code division multiplexing mode in both of time domain and frequency domain.

In a third type, the first type of code division multiplexing mode is a code division multiplexing mode on consecutive subcarriers, and the second type of code division multiplexing mode is a code division multiplexing mode on separated subcarriers.

It should be noted that, the types of the code division multiplexing mode described above are merely illustrative examples, and do not constitute limitations on the present disclosure. Other types of code division multiplexing modes are also within the protection scope of the present disclosure and can be configured correspondingly according to actual conditions.

In another alternative example of this embodiment, the configuration information involved in this embodiment further includes a grouping mode of code division multiplexed ports. The grouping mode of code division multiplexed ports includes U candidate modes, and the U candidate modes are divided into Y sets. The type of the CSI-RS port-numbering mode is selected based one of the Y sets to which the grouping mode of code division multiplexed ports belongs, and U and Y are integers greater than 1. The Y sets includes a first set using a first type of CSI-RS port-numbering mode, a second set using a second type of CSI-RS port-numbering mode, and a third set using the first type of CSI-RS port-numbering mode or the second type of CSI-RS port-numbering mode. The first type of CSI-RS port-numbering mode is different from the second type of CSI-RS port-numbering mode.

In addition, for the candidate port-numbering modes involved in this embodiment, the candidate port-numbering modes may involve multiple types. The candidate port-numbering modes are described below through examples.

(1): the candidate port-numbering mode may be: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter. This candidate port-numbering mode may be determined through a mapping relationship of a following function:

$$p_{T_{port}} = k*\left(\frac{N}{2}\right) + p_{N_{port\_k}} + \frac{N*(K-1)}{2}*u\left(p_{N_{port\_k}} - \frac{N}{2}\right),$$

$$u(n) = \begin{cases} 1, n \geq 0 \\ 0, n < 0 \end{cases}$$

$p_{T_{port}}$ denotes a port number of a CSI-RS having T ports, k denotes a sequence number of a component, $p_{N_{port\_k}}$ denotes a port number in a CSI-RS of a kth component, the number of ports in the CSI-RS of the kth component is N, the value of k ranges from 0 to N−1, and N is an integer greater than 1.

(2), the candidate port-numbering mode may be: ports of each of the components are successively arranged in the aggregated CSI-RS. This candidate port-numbering mode may be determined through a mapping relationship of a following function:

$$p_{T_{port}} = k*N + p_{N_{port\_k}}$$

$p_{T_{port}}$ denotes a port number of a CSI-RS having T ports, k denotes a sequence number of a component, $p_{N_{port\_k}}$ denotes a port number in a CSI-RS of the kth component, the number of ports in the CSI-RS of the kth component is N, the value of k ranges from 0 to N−1, and N is an integer greater than 1.

(3): the candidate port-numbering mode may be: exchanging positions of a 17th port and a 19th port for each of the components, exchanging positions of a 18th port and a 20th port for each of the components, and arranging the components according to sequence numbers thereof in an ascending order. This candidate port-numbering mode may be determined through a mapping relationship of a following function:

$$p_{T_{port}} = k*N + p_{N_{port\_k}} + 2*\delta(p_{N_{port\_k}} - 17) +$$
$$2*\delta(p_{N_{port\_k}} - 18) - 2*\delta(p_{N_{port\_k}} - 19) - 2*\delta(p_{N_{port\_k}} - 20)$$

$$\delta(n) = \begin{cases} 1, & n = 0 \\ 0, & n \neq 0 \end{cases}$$

$p_{T_{port}}$ denotes a port number of a CSI-RS having T ports, k denotes a sequence number of a component, $p_{N_{port\_k}}$ denotes a port number in a CSI-RS of the kth component, the number of ports in the CSI-RS of the kth component is N, the value of k ranges from 0 to N−1, and N is an integer greater than 1.

In another alternative example of this embodiment, a port-numbering mode indicated by a value of (N, K) being (8, 2) is as follow: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter, where (N, K) denotes a number pair composed of values of N and K. This candidate port-numbering mode may be determined through a mapping relationship of a following function:

$$p_{T_{port}} = k*\left(\frac{N}{2}\right) + p_{N_{port\_k}} + \frac{N*(K-1)}{2}*u\left(p_{N_{port\_k}} - \frac{N}{2}\right),$$

$$u(n) = \begin{cases} 1, n \geq 0 \\ 0, n < 0 \end{cases}$$

$p_{T_{port}}$ denotes a port number of a CSI-RS having T ports, k denotes a sequence number of a component, $p_{N_{port\_k}}$ denotes a port number in a CSI-RS of the kth component, the number of ports in the CSI-RS of the kth component is N, the value of k ranges from 0 to N−1, and N is an integer greater than 1.

It can be learned from the above alternative example, the port-numbering mode indicated by (N, K) the value of which is (8, 2) is the candidate port-numbering mode (1) in the first case in the above embodiments. That is, the N and K in the mentioned in the candidate port-numbering mode (1) in the first case in the above embodiments may have multiple values. However, when the value of (N, K) is (8, 2), the candidate port-numbering mode can only be the candidate port-numbering mode (1) in the first case.

The case of the candidate port-numbering mode (2) in the second case is similar. The N and K in the mentioned in the candidate port-numbering mode (2) in the second case may have multiple values. However, when the value of (N, K) is that the value of (N, K) is (2, 8) or (2, 6), the indicated candidate port-numbering mode can only be the candidate port-numbering mode (2) in the second case. That is, when the value of (N, K) is (2, 8) or (2, 6), the port-numbering mode is: ports of each of the components are successively arranged in an aggregated CSI-RS, where (N, K) denotes a number pair composed of values of N and K. This candidate port-numbering mode may be determined through a mapping relationship of a following function:

$$p_{T_{port}} = k*N + p_{N_{port\_k}}$$

$p_{T_{port}}$ denotes a port number of a CSI-RS having T ports, k denotes a sequence number of a component, $p_{N_{port\_k}}$ denotes a port number in a CSI-RS of the kth component, the number of ports in the CSI-RS of the kth component is N, the value of k ranges from 0 to N−1, and N is an integer greater than 1.

The case of the candidate port-numbering mode (3) in the third case is similar. The N and K mentioned in the candidate port-numbering mode (3) in the third case may have multiple values. The configuration information further includes an inter-port code division multiplexing length. However, the port-numbering mode indicated by the inter-port code division multiplexing length of 4 can only be the candidate port-numbering mode (3) in the third case. That is, the port-numbering mode having an inter-port code division multiplexing length of 4 is: exchanging positions of a 17th port and a 19th port for each of the components, exchanging a position of a 18th port and a 20th port for each of the components, and arranging the components in an ascending order according to sequence numbers thereof. This candidate port-numbering mode may be determined through a mapping relationship of a following function:

$$p_{T_{port}} = k*N + p_{N_{port\_k}} + 2*\delta(p_{N_{port\_k}} - 17) +$$
$$2*\delta(p_{N_{port\_k}} - 18) - 2*\delta(p_{N_{port\_k}} - 19) - 2*\delta(p_{N_{port\_k}} - 20)$$
$$\delta(n) = \begin{cases} 1, & n = 0 \\ 0, & n \neq 0 \end{cases}$$

$p_{T_{port}}$ denotes a port number of a CSI-RS having T ports, k denotes a sequence number of a component, $p_{N_{port\_k}}$ denotes a port number in a CSI-RS of the kth component, the number of ports in the CSI-RS of the kth component is N, the value of k ranges from 0 to N−1, and N is an integer greater than 1.

In another alternative example of this embodiment, the configuration involved in this embodiment may further include a grouping mode of code division multiplexed ports. The M types of CSI-RS port-numbering mode are divided into E sets, and a type of the grouping mode of code division multiplexed ports is selected based on one of the E sets to which a selected CSI-RS-port-numbering mode belongs, where E is an integer greater than 1. The number of the E sets of the M types of CSI-RS port-numbering mode is 3, and the 3 sets include: a first set using a first type of grouping mode of code division multiplexed ports, a second set using a second type of grouping mode of code division multiplexed ports, and a third set using the first type of grouping mode of code division multiplexed ports or the second type of grouping mode of code division multiplexed ports. The first type of grouping mode of code division multiplexed ports is different from the second type of grouping mode of code division multiplexed ports.

In another alternative example of this embodiment, the configuration information involved in this embodiment may further include a grouping mode of code division multiplexed ports. A candidate type of the grouping mode of code division multiplexed ports includes: in a same group, differences between two maximum port numbers and two minimum port numbers are $$\frac{(k*N)}{2}.$$

Based on this candidate grouping mode of code division multiplexed ports, the port number in the same group of the candidate grouping mode of code division multiplexed ports in a specific example of this embodiment is:

$$\left\{(15, 16), (15, 16) + \frac{k*N}{2}\right\} + m*2, m = 0, 1, 2, 3,$$

where m is a sequence number for distinguishing different groups.

In another alternative example of this embodiment, the configuration information involved in this embodiment may further include a grouping mode of code division multiplexed ports. A candidate type of the grouping mode of code division multiplexed ports includes: in a same group, differences between two large port numbers and two smaller port numbers are 4. In a specific example of this embodiment, the port number in the same group in the candidate grouping mode of code division multiplexed ports is:
{(15, 16), (15, 16)+4}+m+k*N, m=0, 2 where m is a sequence number for distinguishing different groups, k is a sequence number for distinguishing components of an aggregated CSI-RS, and a value of k is 0 or 1.

In another alternative example of this embodiment, the configuration information further includes a grouping mode of code division multiplexed ports, and a candidate type of the grouping mode of code division multiplexed ports includes: sequence numbers of ports in a same group are consecutive. In a specific example of this embodiment, the port number in the same group in the candidate grouping mode of code division multiplexed ports is {15, 16, 17, 18}+4*m, m=0, 1, 2, 3, where m is a sequence number for distinguishing different groups.

It should be noted that each of the above modules may be implemented by software or hardware. For the latter, the above modules may be implemented in the following manner, but it is not limited thereto: the above modules are all in the same processor; or the above modules are respectively in multiple processor.

The present disclosure will be described below by way of examples in conjunction with alternative embodiments and accompanying drawings of the present disclosure.

Figure 10:
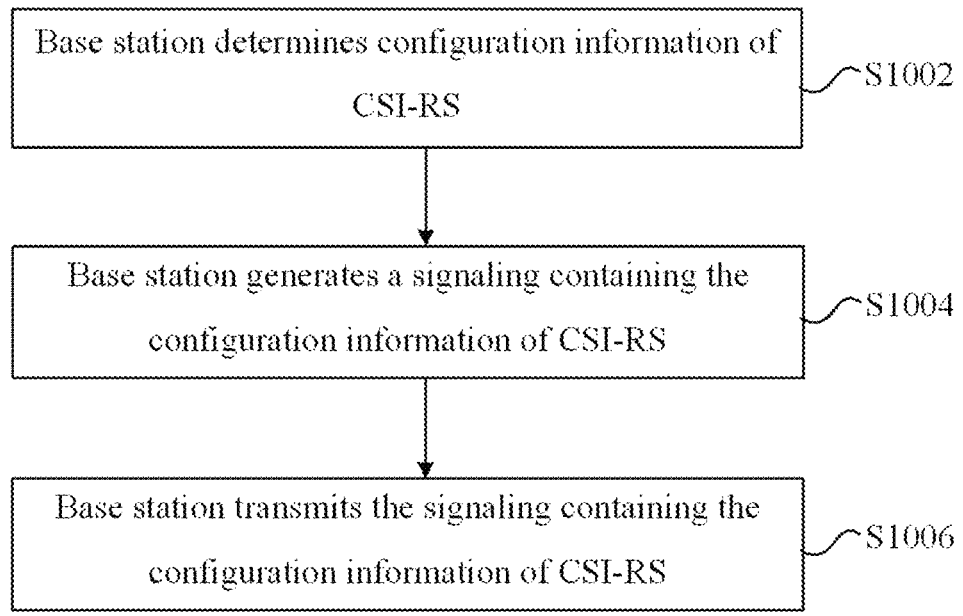
FIG. 10 is a flowchart of a method for configuring a channel state information reference signal according to an alternative embodiment of the present disclosure.

FIG. 10 is a flowchart of a method for configuring a channel state information reference signal according to an alternative embodiment of the present disclosure. As shown in FIG. 10, the method for configuring a channel state information reference signal provided by this alternative embodiment includes the following steps.

In step S1002, a base station determines configuration information of the CSI-RS.

In step S1004, the base station generates a signaling containing the configuration information of the CSI-RS.

In step S1006, the base station transmits the signaling containing the configuration information of the CSI-RS.

The configuration information comprises at least one of: the number of CSI-RS ports, a number K of components of a pilot resource pattern, a number N of ports of the components of the pilot resource pattern, and a CSI-RS port-numbering mode. The CSI-RS port-numbering mode has M types of candidate port-numbering mode, and M, K, and N are positive integers.

Optionally, (N, K) has Q candidate values, and the Q candidate values are divided into X sets. Each of the X sets uses a type of CSI-RS port-numbering mode. The types of CSI-RS port-numbering mode used by different sets are different. Q and X are integers greater than 1.

Different values of the (N, K) represent different aggregation manners of the CSI-RS, so the port-numbering modes after the aggregation are different so as to reflect the reflection of the port arrangement on the topology position and the polarization positon of the ports. For example, the value of (N, K) may be (8, 2), (2, 8), and the like.

The above-mentioned type of CSI-RS port sorting mode may be: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter. Another type of CSI-RS port sorting mode may be: ports of each of the components are successively arranged in the aggregated CSI-RS.

Optionally, the (N, K) has Q candidate values, and the Q candidate values are divided into 3 sets including a first set using a first type of CSI-RI port-numbering mode, a second set using a second type of CSI-RS port-numbering mode, and a third set using the first type of CSI-RS port-numbering mode or the second type of CSI-RS port-numbering mode.

The first type of CSI-RS port-numbering mode is different from the second type of CSI-RS port-numbering mode.

Different values of the (N, K) represent different aggregation manners of the CSI-RS, so the port-numbering modes after the aggregation are different so as to reflect the reflection of the port arrangement on the topology position and the polarization positon of the ports. For example, the value of (N, K) may be (8, 2), (2, 8), (4, 3), etc.

Optionally, the configuration information further includes a code division multiplexing mode between ports. A first type of code division multiplexing mode uses the first type of CSI-RS port-numbering mode, and a second type of code division multiplexing mode uses a second type of CSI-RS port-numbering mode. The first type of code division multiplexing mode is different from the second type of code division multiplexing mode, and the first type of CSI-RS port-numbering mode is different from the second type of CSI-RS port-numbering mode.

The code division multiplexing mode is also associated with the CSI-RS port-numbering mode. The code division multiplexing length may be 2, or may be 5. The code division multiplexing may be performed in time domain, or may be performed in both of time domain and the frequency domain. Therefore, the code division multiplexing mode also influences the port-numbering mode.

It should be noted that the first code division multiplexing mode is a code division multiplexing mode having a multiplexing length of 2, and the second code division multiplexing mode is a code division multiplexing mode having a multiplexing length of 4. Alternatively, the first code division multiplexing mode is a code division multiplexing mode only in time domain, and the second code division multiplexing mode is a code division multiplexing mode in both of time domain and frequency domain. Alternatively, the first type of code division multiplexing mode is a code division multiplexing mode on consecutive subcarriers, and the second type of code division multiplexing mode is a code division multiplexing mode on separated subcarriers.

Optionally, the configuration information further includes: a grouping mode of code division multiplexed ports, and the grouping mode of code division multiplexed ports includes U candidate modes. The U candidate modes are divided into Y sets. Each of the Y sets uses a type of CSI-RS port-numbering mode, and CSI-RS port-numbering modes used by different sets are of different types. U and Y are integers greater than 1.

It should be noted that the grouping mode of code division multiplexed ports may be: ports with consecutive port numbers are in a group. Alternatively, ports with alternate port numbers are in a group. The grouping mode of code division multiplexed ports may also be that differences between two port numbers which have larger sequence numbers and two port numbers which have smaller sequence numbers are a predetermined value. Different grouping modes influence the CSI_RS port-numbering mode.

Optionally, the configuration information further includes: a grouping mode of code division multiplexed ports. The grouping mode of code division multiplexed ports includes U candidate modes. The U candidate modes are divided into 3 sets. The first set using a first type of grouping mode of code division multiplexed ports, the second set using a second type of grouping mode of code division multiplexed ports, and the third set using the first type of grouping mode of code division multiplexed ports or the second type of grouping mode of code division multiplexed ports. The first type of grouping mode of code division multiplexed ports is different from the second type of grouping mode of code division multiplexed ports.

In this alternative embodiment, the candidate port-numbering modes at least include the following ones.

In A1, there exists a type of port-numbering mode: N*K/2 ports whose port numbers are ahead correspond to N/2 ports in the components of the pilot resource pattern whose port numbers are ahead, where there are K components; and N*K/2 ports whose port numbers are latter correspond to N/2 ports in the components of the pilot resource pattern whose port numbers are latter, where there are K components. It should be noted that the ports of the first half of each component are arranged first, and then the ports of the second half of each component are arranged.

Optionally, this candidate port-numbering mode A1 may be determined through a mapping relationship of a following function:

$$p_{T_{port}} = k*\left(\frac{N}{2}\right) + p_{N_{port\_k}} + \frac{N*(K-1)}{2} * u\left(p_{N_{port\_k}} - \frac{N}{2}\right),$$

$$u(n) = \begin{cases} 1, n \geq 0 \\ 0, n < 0 \end{cases}$$

$p_{T_{port}}$ denotes a port number of a CSI-RS having T ports, k denotes a sequence number of a component, $p_{N_{port\_k}}$ denotes a port number in a CSI-RS of a kth component, the number of ports in the CSI-RS of the kth component is N, the value of k ranges from 0 to N−1, and N is an integer greater than 1.

In A2, there exists a type of port-numbering mode: ports of each of the components are successively arranged in the aggregated CSI-RS.

It should be noted that the ports of one component are arranged, and then the ports of another component are arranged, and finally ports of all component are arranged.

This candidate port-numbering mode A2 may be determined through a mapping relationship of a following function:

$$p_{T_{port}} = k*N + p_{N_{port\_k}}$$

$p_{T_{port}}$ denotes a port number of a CSI-RS having T ports, k denotes a sequence number of a component, $p_{N_{port\_k}}$ denotes a port number in a CSI-RS of the kth component, the number of ports in the CSI-RS of the kth component is N, the value of k ranges from 0 to N−1.

In A2, there exists a type of port-numbering mode: exchanging positions of a 17th port and a 19th port for each of the components, exchanging positions of a 18th port and a 20th port for each of the components, and arranging the components according to sequence numbers thereof in an ascending order. It should be noted that the positions of ports are exchanged in each of the components and the components are arranged in an ascending order.

This candidate port-numbering mode A3 may be determined through a mapping relationship of a following function:

$$p_{T_{port}} = k*N + p_{N_{port\_k}} + 2*\delta(p_{N_{port\_k}} - 17) +$$
$$2*\delta(p_{N_{port\_k}} - 18) - 2*\delta(p_{N_{port\_k}} - 19) - 2*\delta(p_{N_{port\_k}} - 20)$$

$$\delta(n) = \begin{cases} 1, & n = 0 \\ 0, & n \neq 0 \end{cases}$$

$p_{Tport}$ denotes a port number of a CSI-RS having T ports, k denotes a sequence number of a component, $p_{Nport\_k}$ denotes a port number in a CSI-RS of the kth component, the number of ports in the CSI-RS of the kth component is N, the value of k ranges from 0 to N−1.

Optionally, when the value of (N, K) is (8, 2), the candidate port-numbering mode A1 is used.

Optionally, when the value of (N, K) is (2, 8) or (2, 6), the candidate port-numbering mode A2 is used.

Optionally, when the inter-port code division multiplexing length is 4, the candidate port-numbering mode A3 is used.

Optionally, the configuration information further includes: a grouping mode of code division multiplexed ports. The M types of CSI-RS port-numbering mode are divided into E sets. Each of the E sets uses a type of the grouping mode of code division multiplexed ports, and grouping mode of code division multiplexed ports used by different sets are of different types. E is an integer greater than 1. It should be noted that the CSI-RS port-numbering mode also influences the grouping mode of code division multiplexed ports.

Optionally, the configuration information further includes: a grouping mode of code division multiplexed ports. The M types of CSI-RS port-numbering mode are divided into 3 sets. A first set using a first type of grouping mode of code division multiplexed ports, a second set using a second type of grouping mode of code division multiplexed ports, and a third set using the first type of grouping mode of code division multiplexed ports or the second type of grouping mode of code division multiplexed ports. The first type of grouping mode of code division multiplexed ports is different from the second type of grouping mode of code division multiplexed ports.

B1: preferably, the configuration information further includes a grouping mode of code division multiplexed ports. There exists a candidate type of the grouping mode of code division multiplexed ports, in which, in a same group, differences between two larger port numbers and two smaller port numbers are $$\frac{k*N}{2}.$$

For example, for 4 port numbers (a0, a1, a2, a3) in a group, $$a2-a0 = a3-a1 = \frac{k*N}{2}.$$

B2: the configuration information further includes a grouping mode of code division multiplexed ports. There exists a candidate type of the grouping mode of code division multiplexed ports, in which, port numbers in the same group are $$\left\{(15, 16), (15, 16)+\frac{k*N}{2}\right\}+m*2, m = 0, 1, 2, 3,$$

where m is a sequence number for distinguishing different groups.

B3: the configuration information further includes a grouping mode of code division multiplexed ports. There exists a candidate type of the grouping mode of code division multiplexed ports, in which, differences between two port numbers which have larger sequence numbers and two port numbers which have smaller sequence numbers are 4.

For example, for 4 port numbers (a0, a1, a2, a3) in a group, a2-a0=a3-a1=4.

B4: the configuration information further includes a grouping mode of code division multiplexed ports. There exists a candidate type of the grouping mode of code division multiplexed ports, in which, port numbers in the same group are {(15, 16), (15, 16)+4}+m+k*N, m=0, 2, where m is a sequence number for distinguishing different groups, k is a sequence number for distinguishing components of an aggregated CSI-RS, and a value of k is 1 or 0.

B5, the configuration information further includes a grouping mode of code division multiplexed ports. There exists a candidate type of the grouping mode of code division multiplexed ports, in which, port numbers in a same group are consecutive.

For example, for 4 port numbers (a0, a1, a2, a3) in a group, a1-a0=a2-a1=a3-a2=1.

B6, the configuration information further includes a grouping mode of code division multiplexed ports. There exists a candidate type of the grouping mode of code division multiplexed ports, in which, port numbers in a same group are:

{15, 16, 17, 18}+4*m, m=0, 1, 2, 3, where m is a sequence number for distinguishing different groups.

Figure 11:
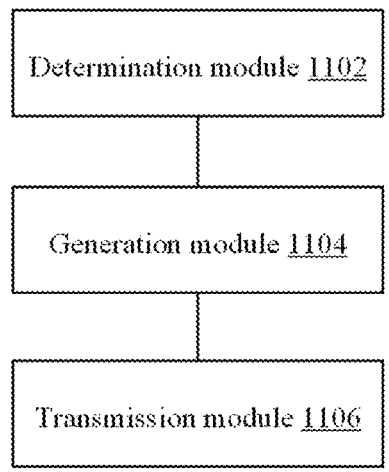
FIG. 11 is a schematic diagram of a device for configuring a CSI-RS according to an alternative embodiment of the present disclosure.

FIG. 11 is a schematic diagram of a device for configuring a CSI-RS according to an alternative embodiment of the present disclosure. As shown in FIG. 11, the device for configuring the CSI-RS provided by this embodiment is installed at a base station and includes a determination module 1102, a generation module 1104, and a transmission module 1106. The determination module 1102 is configured to determine the configuration information of the CSI-RS. The generation module 1104 is configured to generate a signaling containing the configuration information of the CSI-RS. The transmission module 1106 is configured to transmit the signaling containing the configuration information of the CSI-RS. The configuration information comprises at least one of: a number of CSI-RS ports, a number K of components of a pilot resource pattern, a number N of ports of the components of the pilot resource pattern, and a CSI-RS port-numbering mode. The CSI-RS port-numbering mode has M types of candidate port-numbering mode, and M, K, and N are positive integers.

Alternative embodiments of the present disclosure are described below by means of multiple specific embodiments.

Embodiment One

In this embodiment, the base station determines the configuration information of the CSI-RS firstly, and then generates the signaling containing the configuration information of the CSI-RS, and finally transmits the signaling containing the configuration information of the CSI-RS. For example, bit "a" is used for representing the port quantity information, bit "b" is used for representing the number of components of the pilot resource pattern, bit "c" is used for representing the number of ports of the components of the pilot resource pattern, and bit "d" is used for representing the type of the CSI-RS port-numbering mode, where a+b+c+d=X.

Alternatively, the bit "a" may be used for representing the port quantity information, the bit "b" is a combination code used for representing the number of components of the pilot resource pattern and the number of ports of the components of the pilot resource pattern, and bit "c" is used for representing the type of the CSI-RS port-numbering mode, where a+b+c=X.

Alternatively, a bit "X" may be a combination code used for representing the port quantity information, the number of components of the pilot resource pattern, the number of ports of the components of the pilot resource pattern, and the type of the CSI-RS port-numbering mode.

Alternatively, the bit "a" may be used for representing the port quantity information, and the bit "b" is used for representing the number of components of the pilot resource pattern, the number of ports of the components of the pilot resource pattern, and the type of the CSI-RS port-numbering mode.

The port quantity may be a value selected from {1, 2, 4, 8, 12, 16}.

The CSI-RS has M types of candidate port-numbering mode, where M is an integer greater than 1.

Embodiment Two

In this embodiment, (N, K) has Q candidate values, and the Q candidate values are divided into X sets. Each sets uses one of the M types of candidate port-numbering mode, and port-numbering modes used by different sets are of different types. Q and X are integers greater than 1. For example, (N, K)=(8, 2) is a set corresponding to the above mentioned sorting mode A1, (N, K)=(2, 8) is a set corresponding to the above mentioned sorting mode A3, and (N, K)=(4, 3) is a set corresponding to the above mentioned sorting mode A5. (8, 2), (2, 8) and (4, 3) are sets respectively. Alternatively, (N, K)=(8, 2) is a set corresponding to the above mentioned sorting mode A1, (N, K)=(2, 8) is a set corresponding to the above mentioned sorting mode A3, and (N, K)=(2, 6) is a set corresponding to the above mentioned sorting mode A3. (8, 2) is one set, and (2, 8) and (2, 6) are another set.

Embodiment Three

The (N, K) has Q candidate values, and the Q candidate values are divided into 3 sets. The first set uses the first type of CSI-RS port-numbering mode. The second set uses the second type of CSI-RS port-numbering mode. The third set uses the first type of CSI-RS port-numbering mode or the second type of CSI-RS port-numbering mode. The first type of CSI-RS port-numbering mode is different from the second type of CSI-RS port-numbering mode.

For example, the CSI-RS port-numbering mode of the first pattern set uses the sorting method A2, the CSI-RS port-numbering mode of the first pattern set uses the sorting method A4, and the CSI-RS port-numbering mode of the first pattern set use either A2 or A4; the CSI-RS port-numbering mode of the first pattern set uses the sorting method A4, the CSI-RS port-numbering mode of the first pattern set uses the sorting method A2, and the CSI-RS port-numbering mode of the first pattern set use either A2 or A4.

Embodiment Four

In this embodiment, the first type of code division multiplexing mode uses the first type of CSI-RS port-numbering mode, and the second type of code division multiplexing mode uses the second type of CSI-RS port-numbering mode. The first type of code division multiplexing mode is different from the second type of code division multiplexing mode. The first type of CSI-RS port-numbering mode is different from the second type of CSI-RS port-numbering mode.

For example, the code division multiplexing mode having a code division multiplexing length of 2 uses the sorting mode A3, and the code division multiplexing mode having a code division multiplexing length of 4 uses the sorting mode A2. Alternatively, the code division multiplexing mode only in time domain uses the sorting mode A1, and the code division multiplexing mode in both of the time domain and the frequency domain uses the sorting mode A5. The code division multiplexing mode on consecutive subcarriers uses the sorting mode A5, and the code division multiplexing mode on separated subcarriers uses the sorting mode A3.

Embodiment Five

In this embodiment, the grouping mode of code division multiplexed ports has U candidate modes, and the U candidate modes are divided into Y sets. Each of the Y sets uses a type of CSI-RS port-numbering mode, and CSI-RS port-numbering modes used by different sets are of different types. U and Y are integers greater than 1.

For example, the first set is {the grouping mode B1, the grouping mode B2} using the sorting mode A1, and the second set is {the grouping mode B3, the grouping mode B4} using the sorting mode A3. Alternatively, the first set is {the grouping mode B1, the grouping mode B2} using the sorting mode A2, the second set is {the grouping mode B3, the grouping mode B4} using the sorting mode A4, and the third set is {the grouping mode B5, the grouping mode B6} using the sorting mode A6.

Embodiment Six

In this embodiment, the grouping mode of code division multiplexed ports includes U candidate modes, and the U candidate modes are divided into 3 sets. The first set uses the first type of CSI-RS port-numbering mode, the second set uses the second type of CSI-RS port-numbering mode, and the third set uses the first type of CSI-RS port-numbering mode or the second type of CSI-RS port-numbering mode. The first type of CSI-RS port-numbering mode is different from the second type of CSI-RS port-numbering mode.

For example, the first set is {the grouping mode B1} and uses the sorting mode A1, the second set is {the grouping mode B3} and uses the sorting mode A3, and the third set is {the grouping mode B2, the grouping mode B4} and uses the sorting mode A1 or the sorting mode A3. Alternatively, the first set is {the grouping mode B1, the grouping mode B2} and uses the sorting mode A2, the second set is {the grouping mode B3, the grouping mode B4} and uses the sorting mode A4, and the third set is {the grouping mode B5, the grouping mode B6} and uses the sorting mode A1 or the sorting mode A3.

Embodiment Seven

In this embodiment, there exists a candidate port-numbering mode, in which, N*K/2 ports whose port numbers are ahead correspond to N/2 ports in the components of the pilot resource pattern whose port numbers are ahead, and there are K components; and N*K/2 ports whose port numbers are latter correspond to N/2 ports in the components of the pilot resource pattern whose port numbers are latter, there are K components.

For example, N=8, K=2, the sorting is: the port numbers of the 0th component are (0, 1, 2, 3), the port numbers of the first component are (0, 1, 2, 3), the port numbers of the 0th component are (4, 5, 6, 7), and the port numbers of the first component are (4, 5, 6, 7).

Alternatively, N=8, K=2, the sorting is: the port numbers of the 0th component are (15, 16, 17, 18), the port numbers of the first component are (15, 16, 17, 18), the port numbers of the 0th component are (19, 20, 21, 22), and the port numbers of the first component are (19, 20, 21, 22). In other words, ports of the components are re-numbered according to the port sequence after the aggregation: the port numbers (15, 16, 17, 18) of the 0th component are re-numbered as (15, 16, 17, 18), the port numbers (15, 16, 17, 18) of the first component are re-numbered as (19, 20, 21, 22), the port numbers (19, 20, 21, 22) of the 0th component are re-numbered as (23, 24, 25, 26), and the port numbers (19, 20, 21, 22) of the first component are re-numbered as (27, 28, 29, 30).

Alternatively, N=8, K=3, the sorting is: the port numbers of the 0th component are (0, 1, 2, 3), the port numbers of the first component are (0, 1, 2, 3), the port numbers of the second component are (0, 1, 2, 3), the port numbers of the 0th component are (4, 5, 6, 7), the port numbers of the first component are (4, 5, 6, 7), and the port numbers of the second component are (4, 5, 6, 7).

Embodiment Eight

In this embodiment, there exists a candidate port-numbering mode determined according to a mapping relationship of a following function:

$$p_{T_{port}} = k*\left(\frac{N}{2}\right) + p_{N_{port\_k}} + \frac{N*(K-1)}{2}*u\left(p_{N_{port\_k}} - \frac{N}{2}\right),$$

$$u(n) = \begin{cases} 1, n \geq 0 \\ 0, n < 0 \end{cases}$$

$p_{T_{port}}$ denotes a port number of a CSI-RS having T ports, k denotes a sequence number of a component, $p_{N_{port\_k}}$ denotes a port number in a CSI-RS of a kth component, the number of ports in the CSI-RS of the kth component is N, the value of k ranges from 0 to N−1.

For example, (N, K)=(8, 2) or (N, K)=(4, 3).

Embodiment Nine

In this embodiment, there exists a candidate port-numbering mode, in which, ports of each of the components are successively arranged in the CSI-RS after aggregation.

For example, (N, K)=(8, 2), the sorting is: the ports of the first component are (0, 1, 2, 3, 4, 5, 6, 7), and the ports of the second component are (0, 1, 2, 3, 4, 5, 6, 7); (N, K)=(4, 3), the sorting is: the ports of the first component are (0, 1, 2, 3), the ports of the second component are (0, 1, 2, 3), and the ports of the third component are (0, 1, 2, 3).

Alternatively, N=8 and K=2, the sorting is: the port number of the 0th component is (15, 16, 17, 18, 19, 20, 21, 22), and the port number of the first component are (15, 16, 17, 18, 19, 20, 21, 22). In other words, ports of the components are re-numbered according to the port sequence after the aggregation: the port numbers (15, 16, 17, 18, 19, 20, 21, 22) of the 0th component are re-numbered as (15, 16, 17, 18, 19, 20, 21, 22), and the port numbers (15, 16, 17, 18, 19, 20, 21, 22) of the first component are re-numbered as (23, 24, 25, 26, 27, 28, 29, 30).

Embodiment Ten

In this embodiment, there exists a candidate port-numbering mode determined according to a mapping relationship of a following function:

$$p_{T_{port}} = k*N + p_{N_{port\_k}}.$$

For example, (N, K)=(8, 2), or (N, K)=(4, 3).

Embodiment Eleven

In this embodiment, there exists a candidate port-numbering mode: exchanging positions of a 17th port and a 19th port for each of the components, exchanging positions of a 18th port and a 20th port for each of the components, and arranging the components according to sequence numbers thereof in an ascending order.

For example, the first component is (0, 1, 2, 3, 4, 5, 6, 7), and the second component is (0, 1, 2, 3, 4, 5, 6, 7).

Alternatively, the first component is (15, 16, 17, 18, 19, 20, 21, 22), and the second component is (15, 16, 17, 18, 19, 20, 21, 22). In other words, ports of the components are re-numbered according to the port sequence after the aggregation: the port numbers (15, 16, 17, 18, 19, 20, 21, 22) of the 0th component are re-numbered as (15, 16, 17, 18, 19, 20, 21, 22), and the port numbers (15, 16, 17, 18, 19, 20, 21, 22) of the first component are re-numbered as (23, 24, 25, 26, 27, 28, 29, 30).

Embodiment Twelve

In this embodiment, there exists a candidate port-numbering mode determined according to a mapping relationship of a following function:

$$p_{T_{port}} = k*N + p_{N_{port\_k}} + 2*\delta(p_{N_{port\_k}} - 17) + \\ 2*\delta(p_{N_{port\_k}} - 18) - 2*\delta(p_{N_{port\_k}} - 19) - 2*\delta(p_{N_{port\_k}} - 20)$$

$$\delta(n) = \begin{cases} 1, & n = 0 \\ 0, & n \neq 0 \end{cases}$$

For example, (N, K)=(8, 2) or (N, K)=(8, 3).

Embodiment Thirteen

In this embodiment, the configuration information further includes: a grouping mode of code division multiplexed ports. The M types of CSI-RS port-numbering mode are divided into E sets. Each of the E sets uses a type of the grouping mode of code division multiplexed ports, and grouping modes of code division multiplexed ports used by different sets are of different types. E is an integer greater than 1.

For example, the first set is {the sorting A1, the sorting A2} and uses the grouping mode B1, and the second set is {the sorting A3, the sorting A4} and uses the grouping mode B3. Alternatively, the first set is {the sorting A1, the sorting A2} and uses the grouping mode B2, the second set is {the sorting A3, the sorting A4} and uses the grouping mode B4, and the third set is {the sorting A5, the sorting A6} and uses the grouping mode B6.

Embodiment Fourteen

In this embodiment, the M types of CSI-RS port-numbering mode are divided into 3 sets. A first set using a first type of grouping mode of code division multiplexed ports, a second set using a second type of grouping mode of code division multiplexed ports, and a third set using the first type of grouping mode of code division multiplexed ports or the second type of grouping mode of code division multiplexed ports. The first type of grouping mode of code division multiplexed ports is different from the second type of grouping mode of code division multiplexed ports.

For example, the first set is {the sorting mode A1} and uses the grouping mode B1, the second set is {the sorting mode A3} and uses the grouping mode B3, and the third set is {the sorting mode A2, the sorting mode A4} and uses the grouping mode B1 or the grouping mode B3. Alternatively, the first set is {the sorting mode A1, the sorting mode A2} and uses the grouping mode B2, the second set is {the sorting mode A3, the sorting mode A4} and uses the grouping mode B4, and the third set is {the sorting mode A5, the sorting mode A6} and uses the grouping mode B1 or the grouping mode B3.

Embodiment Fifteen

In this embodiment, in a same group, differences between two port numbers which have larger sequence numbers and two port numbers which have smaller sequence numbers are $$\frac{k*N}{2}.$$

For example, (N, K)=(8, 2), the port numbers in the group are (0, 1, 8, 9); (N, K)=(4, 3), the port numbers in the group are (0, 1, 6, 7).

Alternatively, (N, K)=(8, 2), port numbers in 4 groups are (15, 16, 22, 23), (17, 18, 25, 26), (19, 20, 27, 28), and (21, 22, 29, 30).

Embodiment Sixteen

In this embodiment, in a same group, differences between two port numbers which have larger sequence numbers and two port numbers which have smaller sequence numbers are 4.

For example, (0, 1, 4, 5) or (15, 16, 19, 20).

Alternatively, (N, K)=(8, 2), port numbers in 4 groups are (15, 16, 19, 20), (17, 18, 21, 22), (23, 24, 27, 28), and (25, 26, 29, 30).

Embodiment Seventeen

In this embodiment, the port numbers in a same group are consecutive.

For example, (0, 1, 2, 3) or (15, 16, 17, 18).

Alternatively, (N, K)=(8, 2), port numbers in 4 groups are (15, 16, 17, 18), (19, 20, 21, 22), (23, 24, 25, 26), and (27, 28, 29, 30).

Embodiments of the present disclosure further provide a storage medium. Optionally, in this embodiment, the above storage medium can be used for storing program codes for executing the following steps.

In step S1, the base station configures the configuration information of the channel state information reference signal.

In step S2, the base station generates the signaling carrying the configuration information of the channel state information reference signal.

In step S3, the base station transmits the signaling carrying the configuration information of the channel state information reference signal.

The configuration information includes at least one of: the number of CSI-RS ports, a number K of components of a pilot resource pattern, a number N of ports of the components of the pilot resource pattern, and a CSI-RS port-numbering mode. The CSI-RS port-numbering mode includes M types of candidate port-numbering mode, and M, K, and N are positive integers.

Alternatively, for specific examples in this embodiment, references may be made to the examples described in the foregoing embodiment and alternative embodiments, which are not described herein again in this embodiment.

Apparently, those skilled in the art should understand that each of the modules or each of the steps of the present disclosure described above can be implemented by a general-purpose computing device, which may be centralized on a single computing device or be distributed in a network composed of multiple computing devices. Alternatively, the modules or steps may be implemented with computing device executable program codes, so the program codes may be stored in the storage device and executed by the computing device, and in some cases, the illustrated or described steps may be performed in an order different from the order here. Alternatively, the modules or steps are made into integrated circuit modules. Alternatively, multiple modules or steps of them are made into a single integrated circuit module. Thus, the present disclosure is not limited to any specific combination of hardware and software.

The foregoing descriptions are merely preferred embodiments of the present disclosure and are not intended to limit the present disclosure. For those skilled in the art, the present disclosure may have various changes and modifications. Any modification, equivalent substitution, and improvement made within the spirit and principle of the present disclosure shall fall within the protection scope of the present disclosure.

INDUSTRIAL APPLICABILITY

According to embodiments of the present disclosure, the configured configuration information of the CSI-RS is transmitted by the base station through the signaling. The configuration information includes at least one of: the number of pilot ports after aggregation, a number K of components of a pilot resource pattern, a number N of ports of the components of the pilot resource pattern, and a CSI-RS port-numbering mode. That is, by configuring the port pairing number composed of N and K and the CSI-RS port-numbering mode, the reference number of the port and the port position represented by the code-book element are consistent with the polarization property, thereby solving a problem in the related art that the serial numbers or the sequence of antenna ports are unable to reflect the positional relationship and polarization property relationship of antennas in actual topology relationships, thereby improving the feedback channel precision and making full use of the signal transmission power.

What is claimed is:

1. A method for configuring a channel state information reference signal (CSI-RS), comprising:
    configuring configuration information of the CSI-RS by a base station;

generating signaling carrying the configuration information of the CSI-RS by the base station; and transmitting the signaling by the base station, wherein the configuration information comprises a CSI-RS port-numbering mode, wherein the CSI-RS port-numbering mode comprises M types of candidate port-numbering mode, and M is a positive integer, wherein the configuration information further comprises a code division multiplexing mode between CSI-RS ports, types of the code division multiplexing mode comprise: a first type of code division multiplexing mode and a second type of code division multiplexing mode, wherein the first type of code division multiplexing mode uses a first type of CSI-RS port-numbering mode, the second type of code division multiplexing mode uses a second type of CSI-RS port-numbering mode, the first type of code division multiplexing mode is different from the second type of code division multiplexing mode, and the first type of CSI-RS port-numbering mode is different from the second type of CSI-RS port-numbering mode, wherein the first type of code division multiplexing mode is a code division multiplexing mode with a multiplexing length of 2, and the second type of code division multiplexing mode is a code division multiplexing mode with a multiplexing length of 4.

2. The method according to claim 1, wherein the configuration information further comprises at least one of: a number of CSI-RS ports, a number K of components of a pilot resource pattern, or a number N of ports of the components of the pilot resource pattern, wherein N and K are positive integers.

3. The method according to claim 2, wherein (N, K) has Q candidate values, the Q candidate values are divided into X sets, a type of the CSI-RS port-numbering mode is selected based on one of the X sets to which the (N, K) belongs, the (N, K) denotes a number pair composed of a value of N and a value of K, and Q and X are integers greater than 1.

4. The method according to claim 2, wherein the candidate port-numbering modes comprise: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter.

5. The method according to claim 1, wherein the CSI-RS port-numbering mode is determined according to a multiplexing length of a code division multiplexing mode between CSI-RS ports.

6. A method for parsing a channel state information reference signal (CSI-RS), comprising:

receiving, by a terminal, signaling transmitted by a base station, wherein the signaling carries configuration information of the CSI-RS configured by the base station; and parsing the configuration information by the terminal, wherein the configuration information comprises a CSI-RS port-numbering mode, wherein the CSI-RS port-numbering mode comprises M types of candidate port-numbering mode, and M is a positive integer, wherein the configuration information further comprises a code division multiplexing mode between CSI-RS ports, types of the code division multiplexing mode comprise: a first type of code division multiplexing mode and a second type of code division multiplexing mode, wherein the first type of code division multiplexing mode uses a first type of CSI-RS port-numbering mode, the second type of code division multiplexing mode uses a second type of CSI-RS port-sorting mode, the first type of code division multiplexing mode is different from the second type of code division multiplexing mode, and the first type of CSI-RS port-numbering mode is different from the second type of CSI-RS port-numbering mode, wherein the first type of code division multiplexing mode is a code division multiplexing mode with a multiplexing length of 2, and the second type of code division multiplexing mode is a code division multiplexing mode with a multiplexing length of 4.

7. The method according to claim 6, wherein the configuration information further comprises at least one of: a number of CSI-RS ports, a number K of components of a pilot resource pattern, or a number N of ports of the components of the pilot resource pattern, wherein N and K are positive integers.

8. The method according to claim 7, wherein (N, K) has Q candidate values, the Q candidate values are divided into X sets, a type of the CSI-RS port-numbering mode is selected based on one of the X sets to which the (N, K) belongs, the (N, K) denotes a number pair composed of a value of N and a value of K, and Q and X are integers greater than 1.

9. The method according to claim 7, wherein the candidate port-numbering modes comprise: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter.

10. The method according to claim 6, wherein the CSI-RS port-numbering mode is determined according to a multiplexing length of a code division multiplexing mode between CSI-RS ports.

11. A device for parsing a channel state information reference signal (CSI-RS), applied to a terminal side, comprising:

a reception module configured to receive signaling that is transmitted by a base station, wherein the signaling carries configuration information of the CSI-RS that is configured by the base station;

a parsing module configured to parse the configuration information, wherein the configuration information comprises a CSI-RS port-numbering mode, wherein the CSI-RS port-numbering mode comprises M types of candidate port-sorting mode, and M is a positive integer, wherein the configuration information further comprises a code division multiplexing mode between CSI-RS ports, types of the code division multiplexing mode comprise: a first type of code division multiplexing mode and a second type of code division multiplexing mode, wherein the first type of code division multiplexing mode uses a first type of CSI-RS port-numbering mode, the second type of code division multiplexing mode uses a second type of CSI-RS port-sorting mode, the first type of code division multiplexing mode is different from the second type of code division multiplexing mode, and the first type of CSI-RS port-numbering mode is different from the second type of CSI-RS port-numbering mode, wherein the first type of code division multiplexing mode is a code division multiplexing mode with a multiplexing length of 2, and the second type of code division multiplexing mode is a code division multiplexing mode with a multiplexing length of 4.

12. The device according to claim 11, wherein the configuration information further comprises at least one of: a number of CSI-RS ports, a number K of components of a pilot resource pattern, or a number N of ports of the components of the pilot resource pattern, wherein N and K are positive integers.

13. The device according to claim 12, wherein (N, K) has Q candidate values, the Q candidate values are divided into X sets, a type of the CSI-RS port-numbering mode is selected based on one of the X sets to which the (N, K) belongs, the (N, K) denotes a number pair composed of a value of N and a value of K, and Q and X are integers greater than 1.

14. The device according to claim 12, wherein the candidate port-numbering modes comprise: N*K/2 ports whose port numbers are ahead correspond to N/2 ports in the components of the pilot resource pattern whose port numbers are ahead, and N*K/2 ports whose port numbers are latter correspond to N/2 ports in the components of the pilot resource pattern whose port numbers are latter.

15. The device according to claim 11, wherein the CSI-RS port-numbering mode is determined according to a multiplexing length of a code division multiplexing mode between CSI-RS ports.

* * * * *

UNITED STATES PATENT AND TRADEMARK OFFICE
CERTIFICATE OF CORRECTION

PATENT NO. : 10,623,154 B2  
APPLICATION NO. : 15/774090  
DATED : April 14, 2020  
INVENTOR(S) : Yong Li Page 1 of 1

It is certified that error appears in the above-identified patent and that said Letters Patent is hereby corrected as shown below:

In the Specification

In Column 3, Line 37, delete "MB SFN" and insert --MBSFN--.

In Column 3, Line 37, delete "MB SFN" and insert --MBSFN--.

In Column 4, Line 47, delete "{r0w0pr1w1p" and insert --{r0w0p, r1w1p--.

Signed and Sealed this  
First Day of September, 2020

Andrei Iancu  
*Director of the United States Patent and Trademark Office*